US008501125B2

(12) United States Patent
Vandor

(10) Patent No.: US 8,501,125 B2
(45) Date of Patent: *Aug. 6, 2013

(54) SYSTEM AND METHOD OF CARBON CAPTURE AND SEQUESTRATION, ENVIRONMENTAL REMEDIATION, AND METALS RECOVERY

(75) Inventor: David Vandor, Tarrytown, NY (US)

(73) Assignee: Expansion Energy, LLC, Tarrytown, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/108,260

(22) Filed: May 16, 2011

(65) Prior Publication Data

US 2011/0214535 A1 Sep. 8, 2011

Related U.S. Application Data

(63) Continuation-in-part of application No. 12/247,902, filed on Oct. 8, 2008, now Pat. No. 7,947,240.

(51) Int. Cl.
*C01F 1/00* (2006.01)
*B01D 53/62* (2006.01)
*C01B 31/24* (2006.01)

(52) U.S. Cl.
USPC ............ 423/165; 423/220; 423/225; 423/230

(58) Field of Classification Search
USPC ................. 210/908, 175, 176, 767, 774, 775; 95/39; 423/220, 225, 226, 230; 62/115, 62/606, 617; 75/10.67
See application file for complete search history.

(56) References Cited

U.S. PATENT DOCUMENTS

| | | | |
|---|---|---|---|
| 2,956,018 A | 10/1960 | Carlyle et al. |
| 3,436,347 A | 4/1969 | Herd et al. |
| 3,579,293 A | 5/1971 | Schultz et al. |
| 4,112,050 A | 9/1978 | Sartori et al. |
| 4,313,916 A | 2/1982 | Jones et al. |
| 5,000,930 A | 3/1991 | Boguslawski |
| 5,100,050 A | 3/1992 | Krueger et al. |
| 6,436,174 B1 | 8/2002 | Grossmann et al. |

(Continued)

FOREIGN PATENT DOCUMENTS

| CN | 1184524 C | 6/1998 |
|---|---|---|
| JP | 60-500999 | 7/1985 |

(Continued)

OTHER PUBLICATIONS

Shi et al., "Carbon Dioxide Sequestration via pH Reduction of Red Mud Using Liquid CO2." Argonne National Laboratory (Feb. 2006).*

(Continued)

*Primary Examiner* — Stuart Hendrickson
*Assistant Examiner* — Daniel Berns
(74) *Attorney, Agent, or Firm* — Eric L. Lane; McKenna Long & Aldridge LLP

(57) ABSTRACT

Systems and methods of capturing and sequestering carbon dioxide, comprising mixing a substantially non-aqueous solvent and an alkali such that the solvent and alkali form a solvent suspension, mixing water and a flue gas containing carbon dioxide with the solvent suspension such that a reaction occurs, the reaction resulting in the formation of a carbonate, water and heat. Methods and processes of environmental remediation and recovering metals from waste streams are also provided.

5 Claims, 7 Drawing Sheets

(56) References Cited

U.S. PATENT DOCUMENTS

| | | | |
|---|---|---|---|
| 6,447,437 | B1* | 9/2002 | Lee et al. .................... 588/250 |
| 7,132,090 | B2 | 11/2006 | Dziedzic et al. |
| 7,947,240 | B2 | 5/2011 | Vandor |
| 2005/0238563 | A1 | 10/2005 | Eighmy et al. |
| 2006/0144797 | A1* | 7/2006 | McConchie et al. .......... 210/724 |
| 2007/0044658 | A1 | 3/2007 | Rochelle et al. |
| 2007/0148069 | A1 | 6/2007 | Chakravarti et al. |
| 2008/0031801 | A1 | 2/2008 | Lackner et al. |
| 2008/0099400 | A1 | 5/2008 | Nemser et al. |
| 2009/0001020 | A1 | 1/2009 | Constantz et al. |
| 2009/0020044 | A1 | 1/2009 | Constantz et al. |
| 2009/0305378 | A1 | 12/2009 | Brent |
| 2010/0084256 | A1 | 4/2010 | Vandor |
| 2010/0111810 | A1 | 5/2010 | Constantz et al. |
| 2010/0139486 | A1* | 6/2010 | Smirniotis et al. .............. 95/139 |
| 2010/0219373 | A1* | 9/2010 | Seeker et al. ............ 252/182.33 |
| 2011/0030586 | A1 | 2/2011 | Constantz et al. |

FOREIGN PATENT DOCUMENTS

| | | |
|---|---|---|
| JP | 04-227017 | 8/1992 |
| JP | 2000-144271 A | 5/2000 |
| JP | 2002-273163 A | 9/2002 |
| WO | WO 2008/018928 | 2/2008 |
| WO | WO 2008/061305 | 5/2008 |

OTHER PUBLICATIONS

Kunerth, "Solubility of CO2 and N20 in Certain Solvents." Phys. Rev. vol. 19, Issue 5 (May 1922), pp. 512-524.*

U.S. Dept. of Energy, "Methane (Biogas) from Anaerobic Digesters." Available online as of Nov. 24, 2004. Viewed Jan. 11, 2012 at http://web.archive.org/web/20041124201613/www.eere.energy.gov/consumerinfo/factsheets/ab5.html.*

Kim et al., "Compaction characteristics and corrosivity of Indiana class-F fly and bottom ash mixtures." Constr. and Building Mater., vol. 22 (2008), pp. 694-702. Available online as of Dec. 12, 2006.*

Vassilev et al., "Geochemistry of coals, coal ashes and combustion wastes from coal-fired power stations." Fuel Processing Tech., vol. 51 (1997), pp. 19-45.*

Burt et al., "Cryogenic CO2 Capture for Improved Efficiency at Reduced Cost"; Extended Abstract, [retrieved from http://aiche.confex.com/aiche/2010/webprogrampreliminary/.

Philip Proefrock, "Cryogenic Carbon Capture Technology Offers Better Capture at Lower Cost", Ecogeek, Nov. 18, 2010 [retrieved from http://www.ecogeek.org/preventing.

Eric Wesoff, "Skyonic Cleans Up Coal:Update", Greentech Media, Dec. 2, 2010; [retrieved from http://www.greentechmedia.com/articles/print/Skyonic-Cleans-Up-Coal-an-.

Li et al., "Utilization of Carbon Dioxide from Coal-fired Power Plant for the Production of Value-added Products" Apr. 27, 2006; [retrieved from http://moritz.botany.ut.ee.

Hsu et al., "Absorption and reaction kinetics of amines and ammonia solutions with carbon dioxide in flue gas", J. Air Waste Manag Assoc. Feb. 2003; 53(2):246-52; On-line.

Soong et al., "CO2 Sequestration Via Brine/bauxite Residue Mixture", National Energy Technology Laboratory, U.S. Department of Energy; Nov. 6, 2007; [retrieved from.

Dilmore et al., "Sequestration of CO2 in Mixtures of Bauxite Residue and Saline Wastewater", National Energy Technology Laboratory, U.S. Department of Energy.

Mani et al., Combined Process of CO2 Capture by Potassium Carbonate and Production of Basic Zinc(II) Cabonates: CO2 Release from Bicarbonate Solutions at Room Temperat.

U.S. Department of Energy "Carbon Dioxide Capture by Absorption with Potassium Carbonate", Project Facts; Carbon Sequestration, Apr. 2008.

House et al. "Electrochemical Acceleration of Chemical Weathering as an Energetically Feasible Approach to Mitigating Anthropogenic Climate Change", Environ. Sci Technol.

Gupta et al.,CO2 Capture Technologies and Opportunities in Canada; "Strawman Document for CO2 capture and Storage (CC&S) Technology Roadmap"; 1st Canadian CC&S Technolog.

Chen et al., "Critical Review of CO2 Separation Technologies for Post Combustion Flue Gases", Fifth Annual Conference on Carbon Capture & Sequestration; May 8-11, 2006,.

Huijgen et al., "Mineral CO2 Sequestration in Alkaline Solid Residues", The Seventh International Conference on Greenhouse Gas Control Technologies (GHGT-7), Vancouver,.

Fly-Ash Concrete, "Nature and Composition." (Mar. 2, 2008). Viewed Nov. 10, 2010 at http://www.flyashconcrete.10/fly_ash/nature_composition.htm.

Internet archive page for http://www.flyashconcrete.in/fly_ash/nature_composition.htm. Viewed Nov. 10, 2010 at http://web.archive.org/web/*/http://www.flyashconcrete.in/fly.

International Search Report issued from related PCT Application No. PCT/US2012/036352, (Mailed by ISA/KR on Nov. 23, 2012).

* cited by examiner

SYSTEM AND METHOD OF CARBON CAPTURE AND SEQUESTRATION, ENVIRONMENTAL REMEDIATION, AND METALS RECOVERY

CROSS-REFERENCE TO RELATED APPLICATION

This application is a continuation-in-part of U.S. patent application Ser. No. 12/247,902, filed Oct. 8, 2008, now U.S. Pat. No. 7,947,240 which is hereby incorporated by reference in its entirety.

FIELD OF THE DISCLOSURE

The present invention relates to carbon capture and sequestration systems and methods and processes of environmental remediation and metals recovery.

BACKGROUND

The capture and sequestration of carbon dioxide ($CO_2$) emissions needs to be significantly improved if the climate change consequences of such emissions are to be controlled or curtailed. The $CO_2$ produced from combustion and industrial processes, including power plant flue gas, is perhaps the largest single greenhouse gas emission. Most existing carbon capture and sequestration methods take a two-step approach. First, they seek to separate $CO_2$ from the flue gas or other gaseous emission source. These may include capture of the $CO_2$ in liquid solvents, solid zeolite or various membranes. However, the capture media need to be regenerated without releasing the $CO_2$ into the atmosphere, and this is difficult to achieve in standard physical separation processes.

The second step is sequestering the $CO_2$ gas or liquid by inserting it into underground geological formations or in deep ocean layers. However, very specific geological configurations are required for disposal of the $CO_2$, and these are not commonly available at $CO_2$ emission sites. Thus, transportation adds substantial cost and difficulty. In addition, it is not known whether $CO_2$ can be permanently sequestered underground. The two-step approach also is not economical because often $CO_2$ represents only a small percentage of a large volume of flue gas, and treating a large flow stream to recover a small portion of it as $CO_2$ is wasteful and expensive.

Another approach to $CO_2$ capture and sequestration involves mining, crushing and transporting rocks to the emission site, where the crushed rock is used to absorb $CO_2$. But this requires a good deal of heat and pressure. The energy input and environmental costs of mining the rock and transporting it to and from the $CO_2$ source, as well as the energy costs of having the crushed rock accept and absorb the $CO_2$, are very high.

Other ways to capture $CO_2$ include chemical absorption using liquids such as amines or aqueous solutions of bases, physical absorption in an appropriate solution, and membrane separation. All of these methods have the problem that the absorption media need to be regenerated without losing $CO_2$. Other capture methods such as physical adsorption and cryogenic separation require significant amounts of energy in the form of heat or pressure. Some $CO_2$ capture methods react $CO_2$ (or carbonic acid formed from water and $CO_2$) with an aqueous solution of an alkali to form a carbonate. However, a significant drawback of that approach is that the carbonate exits the process in solution with water, requiring further, energy intensive treatment to separate the solids and the water, or it results in a large-volume, heavy, wet, cement-like paste that requires energy intensive drying and mechanical systems to control the size, configuration and weight of the resulting dried product. Although some are examining techniques for capturing and sequestering $CO_2$ from ambient air, they are not suitable for $CO_2$ emissions from power plants because of the substantial difference in $CO_2$ concentration between ambient air and flue gas. Ambient air generally contains between about 0.03% and 0.04% $CO_2$, whereas flue gas contains 3.0% or higher concentrations of $CO_2$. Removing very small quantities of $CO_2$ from the very large quantities of ambient air is not as viable and productive as the capture and sequestration of large amounts of $CO_2$ from streams, such as flue gas, where the $CO_2$ is more concentrated. Once the $CO_2$ is released into the atmosphere, control of $CO_2$ is lost. The only effective check point is at the source of $CO_2$ generation.

Many of the same industrial processes that cause $CO_2$ emissions also pollute the environment. For instance, heavy metals become concentrated or enriched in many industrial wastes, such as the Red Mud that is the byproduct of aluminum refining; or fly ash and bottom ash that are the byproducts of coal combustion; or ash from Municipal Solid Waste Incinerators (MSWI), where the ash is the byproduct of burned municipal waste. In all those and other similar waste streams, trace metals are present at the parts-per-million (ppm) level in small absolute concentrations. An environmental burden can be created when these metals leach from ash or Red Mud containment areas. Most of the metals found in ashes (and in Red Mud) are toxic, even at low ppm concentration levels. Chemically, such metals are members of all but two groups of the periodic table, and common examples are arsenic, mercury, lead, uranium, vanadium and nickel. This creates special needs for the disposal of fly ashes (and bottom ash and Red Mud) and establishes a significant environmental burden, beyond the liability that relates to the pH levels observed in ashes.

On the other hand, it is not unusual to find elements enriched in coal and MSWI ashes (and in Red Mud), which have significant economic value, even if they are found in small quantities. Such elements include but are not limited to the following, listed in alphabetical order: Cerium (Ce), Dysprosium (Dy), Europium (Eu), Gallium (Ga), Germanium (Ge), Lanthanum (La), Neodymium (Nd), Niobium (Nb), Terbium (Tb), Uranium (U), Yttrium (Y), and Zirconium (Zr). It is the economic value of some of these metals which makes recovery viable even at levels below 20 ppm in some cases. This includes elements such as uranium and several "rare earth elements." For example, recent commodity prices for Germanium were listed on web-based commodity pricing sites at approximately $545/lb. Terbium was listed at approximately $364/lb. However, several lower-value elements will yield a higher revenue stream when recovered from ash, because those lower-value elements are found at higher concentrations in the ash. For example, Zirconium, Yttrium and Cerium are found in many ash streams at higher concentrations (up to 500 ppm) than, say, Europium, which can be found at 2-5 ppm. When the various recoverable elements are compared to their commodity pricing and their proportion in fly ash, Gallium, Yttrium, Zirconium, Cerium and Lanthanum are five of the most valuable recoverable elements. Rare earth elements are used in computers, photovoltaic cells, wind turbines and other renewable energy systems, hybrid cars, advanced weapons systems, and ubiquitous communications devices, among many other applications. Those uses span the full spectrum of cutting edge technologies aimed at reducing emissions and generally improving the environmental profile (carbon footprint) of many products.

Currently there are few U.S. sources of such elements. China presently accounts for well over 90% of the world's production of rare earth elements. Recent Chinese export restrictions on rare earth elements are affecting production of technology goods in Germany and Japan, demonstrating geo-political limitations regarding raw material availability. There have been several recent proposals to re-open closed mines in the U.S., where such rare earth elements can be found in concentrations high enough to justify the mining and refining operations. The present invention offers a more efficient and less environmentally damaging way to "mine" existing waste streams, solving the following problems at once—$CO_2$ emissions, waste stream mitigation, and rare earth element "mining." To emphasize, the metals addressed by the disclosed processes are, irrespective of specific examples given, the metals and metalloids of all groups of the periodic table, with many of them demonstrating toxic properties or having commercial value, or both.

Waste disposal sites, also known as landfills, naturally produce landfill gas (LFG). The most common waste source accepted at landfills is household waste ("garbage"), collected by public and private trash hauling entities that serve municipalities. Some landfills also accept industrial waste, which may include construction and demolition waste (such as demolished drywall that contains sulfur compounds), as well as alkaline ashes. The LFG produced by the breakdown of the buried waste consists mostly of carbon dioxide, methane and moisture. The $CO_2$ content of typical LFG can be above 50%. Most LFG sites either burn the methane-carrying LFG in engines (or turbines), which drive generators that produce electricity, or they flare the LFG. Either way, the $CO_2$ content of the LFG and the $CO_2$ that is produced by the combustion of methane is released into the atmosphere. Along with the $CO_2$, sulfur compounds are also released, where construction waste is accepted as part of the landfill's waste stream.

Therefore, there exists a need for a commercially viable carbon capture and sequestration process that works at industrial scales, and for such sequestration to be complete and permanent. Specifically, there is a need for a carbon capture system that does not use capture media that require complex and energy-intensive regeneration, and does not yield a heavy, wet end-product that requires energy-intensive drying and other post-capture processing. There is a further need for a carbon capture and sequestration process that permanently sequesters $CO_2$ at the site of $CO_2$ emission. In summary, a need exists for: (1) a carbon capture and sequestration system that is cost-effective and not energy intensive and results in permanent sequestration of $CO_2$, and (2) an energy-efficient process for converting fly ash, Red Mud and other industrial waste streams into environmentally benign materials while isolating valuable trace metals.

SUMMARY OF THE DISCLOSURE

The present disclosure, in its many embodiments, alleviates to a great extent the disadvantages of known carbon capture and sequestration methods by providing a chemical process by which carbon dioxide in the form of carbonic acid is reacted with an alkali to form water and a dry, easily-removable carbonate that precipitates out of solution. The carbonate precipitates (carbonate) formed by this method should be viewed as carbonated feedstock material, such as carbonated fly ash or carbonated Red Mud. The degree of carbonation depends on the alkaline content of the feedstock. Alkali is used to refer to species, such as CaO, capable of reacting with carbon dioxide to form carbonate, either soluble or insoluble, in an alcoholic matrix. Carbon dioxide sequestration is achieved by the above-ground disposal of a resulting carbonate precipitate. This process allows for industrial scale $CO_2$ capture and sequestration at relatively low costs. Embodiments of the present disclosure also provide permanent, on-site $CO_2$ capture and sequestration requiring relatively low energy consumption and yielding recovered metal compounds, some of which have market value and others which require cost-effective and environmentally sound disposal.

In an embodiment of the present invention, known as "Vandor's Carbon Capture and Sequestration Cycle" (VCCS), a method of capturing or sequestering carbon dioxide is provided in which a substantially non-aqueous solvent is mixed with an alkali such that the solvent and alkali form a solvent suspension. This mixing step may be performed in any suitable mixing vessel. The substantially non-aqueous solvent preferably is an alcohol, and is methanol in a most preferred embodiment. As such, the alkali reacts with the methanol to form methoxide, which may also include solvated metal hydroxide. The exact composition of the reactive species is feedstock and equilibrium-dependent. For example, the methanolic slurry may contain hydroxides and methoxides at varying relative amounts concurrently. The use of methoxide in this context refers to a reactive base in a predominantly alcoholic solvent, with methanol representing the preferred solvent. A controlled amount of water and a flue gas containing carbon dioxide are mixed with the solvent suspension such that a reaction occurs, the reaction resulting in the formation of carbonate, water and heat. The terms "solvent" and "non-aqueous solvent" will be used interchangeably herein to mean any substantially non-aqueous solvent that will tolerate some significant amount of alkali to be dissolved in it, and will force the precipitation of salt that is produced in the classic acid+base reaction. The non-aqueous solvent contains less than 50% water, and most preferably less than 10% water.

The gas is preferably flue gas from a power plant, but may be any type of exhaust gas containing $CO_2$ from any energy-producing or industrial process, such as, but not limited to a cement kiln. The flue gas will contain nitrogen ($N_2$) as well. The term "flue gas" will be used herein to mean any exhaust gas stream that contains carbon dioxide and, optionally, nitrogen, sulfur and/or air, the exhaust gas being from a power generation plant's flue, including coal-fired, natural-gas-fired, oil-fired, and landfill gas (LFG)-fired or anaerobic digester (ADG)-fired power plants; from a MSWI; or from any energy-producing or industrial process including, but not limited to, cement making in kilns, the manufacturing of glass, steel, rubber, paper, aluminum, or other materials, oil refining, the production of ethanol or other liquid fuels, and from any combination of flue gas and process gas.

In one embodiment, ash is introduced into the solvent, and the alkali is a constituent of the ash. As used herein, the term "ash" will be used to mean fly ash, bottom ash and all types of alkali-containing ash from any source including from, but not limited to, coal burning, wood burning and other bio-mass burning. In addition, feedstock may include materials which are not derived from combustion, including but not limited to other types of ashes, contaminated soils, sewage sludge materials or Red Mud.

The chemical process of carbon capture and sequestration comprises mixing the water and the flue gas containing carbon dioxide with the alkali suspended in the solvent, preferably methanol, so reactions occur that result substantially in the formation of solid carbonate, water and heat. Small amounts of carbonic acid also are formed in the reactions, and the carbonic acid quickly reacts with the alkali. These reactions may be performed in any suitable reaction vessel. In a preferred embodiment, carbonate precipitates out of solution and is removed from the vessel. Removal of the precipitated carbonate is preferably performed mechanically, using an auger or another suitable mechanical device that allows for the removal of solids without any liquids leaving the vessel at the same location. Any methanol that remains with the removed carbonate evaporates upon the addition of modest amounts of low-grade heat. The removed carbonate will be loose and powdery, rather than clumped and cement-like, as would be the case if the solvent used in the reaction were water.

The water resulting from the reactions in the reaction vessel forms a solution with the solvent, and the method further comprises removing the solution of water and solvent and separating the water from the solvent. After the water and solvent are separated, the separated solvent is re-mixed with new alkali such that the solvent and alkali again form a solvent suspension that can be used for further carbon capture. A controlled amount of separated water is returned to the solvent suspension in the reaction vessel where it joins the flue gas and the methanolic slurry to create anew reaction. In a preferred embodiment, the water is separated from the solvent by chilling the solution of water and solvent in a cryogenic drying vessel. When the solution is chilled, the water falls substantially to the bottom of the cryogenic drying vessel, and the solvent rises substantially to the top of the cryogenic drying vessel. In some embodiments, some carbonate will travel with the solution of water and solvent and precipitate out of the solution in the cryogenic drying vessel, from which it is removed mechanically by an auger or another similar device. A filter may be used to trap larger solids in the reaction vessel, keeping those larger solids from traveling on to the cryogenic drying vessel.

The remaining water may be separated from the solvent using a hot distillation vessel by applying heat to the solution of water and solvent to at least partially vaporize the solvent. A partial vacuum may be used to draw off vaporous solvent from the distillation apparatus, and the vaporous solvent is condensed to a liquid by cooling, and thus made suitable for re-use in the carbon capture and sequestration reactions.

Embodiments of the present invention, include methods of using nitrogen from the flue gas to provide cooling for the carbon capture and sequestration process. Such method may include liquefying the nitrogen and recovering refrigeration from the liquefied nitrogen. The recovered refrigeration from the nitrogen is then used to cool the solvent and provide cooling for the solvent regeneration steps. This use of nitrogen for cooling increases the energy efficiency of embodiments of the invention.

In exemplary embodiments, the flue gas further contains nitrogen and the nitrogen is used in three ways. A first portion of the nitrogen is used for refrigeration during the solvent regeneration process; a second portion is used to enhance the power output of a power plant; and a third portion is sold to off-site customers. All of the nitrogen is first compressed. For the portion used for refrigeration, a refrigerant source provides refrigerant to a heat exchanger, and the nitrogen is chilled in the heat exchanger such that it is substantially liquefied. Refrigeration may be recovered from the substantially liquefied nitrogen after it is pumped to pressure and sent to the power cycle to enhance the power output of the power plant that is the source of the flue gas. The recovered refrigeration is used to provide cooling for the cryogenic solvent removal process, discussed below, that separates the water from the solvent.

A second portion of the nitrogen may be used to enhance the power output of a power plant. In exemplary embodiments, a first portion of this substantially liquefied nitrogen is compressed and heated. The heated compressed nitrogen is directed to a steam cycle of a power plant to enhance the power output of the power plant. A second portion of this substantially liquefied nitrogen may be stored in a storage apparatus. The second portion of the substantially liquefied nitrogen is pressurized by pumping it to pressure. It is then vaporized and directed through a hot gas expander to enhance the power output of the power plant. A third portion of this liquefied nitrogen may be sold to off-site customers for a variety of uses, including as a refrigerant and as a fluid to enhance oil and gas well recovery. In a preferred embodiment the liquefied nitrogen is further refined by removing liquid argon, which is approximately 0.9% of the volume of the recovered nitrogen stream, and which is a high-value product that may also be sold in the marketplace.

Exemplary embodiments include carbon capture and sequestration systems which comprise a carbon capture assembly and a solvent regeneration assembly. The carbon capture assembly comprises a mixing vessel and at least one reaction vessel, and may further include a solvent condenser fluidly connected to the reaction vessel. In the mixing vessel, an alkali (or an alkaline feedstock) is mixed with a substantially non-aqueous solvent to form a suspension. In one embodiment, ash is introduced into the solvent, and the alkali is a constituent of the ash. The non-aqueous solvent preferably is an alcohol, and is methanol in a most preferred embodiment. As such, the alkali reacts with the methanol in the reaction vessel to form methoxide and possibly some metal hydroxide. Minor quantities of dimethyl-carbonate (DMC) may also form, but will quickly decompose under these conditions.

The reaction vessel is fluidly connected to the mixing vessel so it receives the suspension of alkali and a substantially non-aqueous solvent from the mixing vessel through a first input. The reaction vessel also receives flue gas containing heat and carbon dioxide through a second input and a controlled amount of water through a third input such that carbonic acid, carbonate, water and heat are formed in the reaction vessel. More specifically, the carbon dioxide and water and any small amounts of carbonic acid that result from the reactions in the reaction vessel react with the alkali in the vessel, resulting in the formation of carbonate, water and heat. The flue gas will contain nitrogen as well. In some embodiments, the carbon capture assembly further comprises a solvent condenser fluidly connected to the reaction vessel, where refrigeration is used to condense the solvent portion of the exiting stream, which consists of mostly nitrogen.

The solvent regeneration assembly is fluidly connected to the reaction vessel and comprises at least one heat exchanger, a cryogenic drying vessel fluidly connected to the heat exchanger, and a hot distillation vessel fluidly connected to the cryogenic drying vessel. The solvent regeneration assembly preferably has a plurality of heat exchangers to perform several intermediate heat recovery steps to warm the mostly water stream that arrives at the hot distillation vessel and to cool the methanol vapor that leaves the hot distillation vessel.

The carbonate ions formed in the reaction predominantly precipitate out of solution, falling to the bottom of the reaction vessel, and are removed from the reaction vessel as insoluble carbonate. The carbon capture assembly may further comprise an auger or other suitable device to remove the precipitated carbonate from the reaction vessel. The water resulting from the reactions forms a solution with the solvent in the reaction vessel, and this solution of water and solvent is removed from the reaction vessel and directed to the solvent regeneration assembly. The water is separated from the solvent by the solvent regeneration assembly, and the separated solvent is returned to the mixing vessel where it is re-mixed with new alkali to form a solvent suspension. Also, a controlled amount of the separated water is returned to the reaction vessel to continue the reactions.

In some embodiments, a lesser portion of the carbonate (e.g., less than 10% by volume) will stay in the solvent and travel with the solvent suspension through the solvent regeneration assembly. All recoverable and toxic metals which leached from the feedstock are contained in the methanol travelling though the regeneration assembly. Upon regeneration of methanol, those metals are present in concentrated form in the regeneration residues as solids or brine. When the selected alkali is CaO, the solution of water and solvent is free of any carbonates. When the selected alkali is KH, some carbonate will form a solution with the water+solvent. That small portion of carbonate will fall out of the solvent suspension with the water that is separated from it. First, the separation process uses the cryogenic drying vessel in which the solution of water and solvent is chilled so the water falls substantially to the bottom of the cryogenic drying vessel, and the solvent rises substantially to the top of the cryogenic drying vessel. Part (or in a more energy-intensive option, all) of this separation process uses the hot distillation vessel, where heat is applied to the solution of water and solvent, a partial vacuum draws off vaporous solvent from the hot distillation vessel, and the vaporous solvent is condensed.

Some embodiments may include a nitrogen liquefaction assembly which substantially liquefies nitrogen contained in the flue gas and recovers refrigeration from the substantially liquefied nitrogen. The recovered refrigeration from the nitrogen may be used to cool the solvent and to provide cooling for the solvent regeneration assembly. That portion of the liquid nitrogen is sent to the regeneration assembly under pressure, having been pumped to pressure by a cryogenic pump. The solvent regeneration assembly heats a first portion of the substantially liquefied nitrogen and directs the heated nitrogen to a steam cycle of a power plant to enhance the power output of the power plant. A storage apparatus stores a second portion of the substantially liquefied nitrogen, releases the second portion of the substantially liquefied nitrogen, and directs it to a hot gas expander to enhance the power output of a power plant.

Some embodiments may include an Ammonia Absorption Chiller that converts waste heat from several places in disclosed processes to refrigeration, which is used in the cryogenic dryer. Such waste heat may include, but is not limited to, the heat produced by the chemical reactions inherent to the present disclosure.

Exemplary embodiments include methods for separating chemical constituents of flue gas (containing $CO_2$, a relatively large portion of $N_2$, and a much smaller portion of argon) comprising mixing a substantially non-aqueous solvent and an alkali such that the solvent and alkali form a solvent suspension. Water and a flue gas containing carbon dioxide and nitrogen are introduced to the solvent suspension. The alkali in the solvent suspension is contacted with the water and the carbon dioxide in the flue gas such that a series of fast-paced chemical reactions occur. The reactions result in the formation of carbonate, water and heat, with the unreacted mostly-nitrogen portion leaving the reaction vessel as a gas, and carrying with it small quantities of vaporized solvent.

That mostly-nitrogen stream is chilled in a solvent condenser so as to liquefy that small solvent portion, which is returned to the methanol+alkali mixing vessel. The remaining mostly-nitrogen gas stream is liquefied by compressing and chilling the nitrogen. In a preferred embodiment, the refrigeration content of the substantially liquefied nitrogen is recovered and used to provide cooling for separating the water from the solvent. The nitrogen portion used for cooling is first compressed by pumping it to pressure using a cryogenic liquid pump and then heated by recovered heat in the solvent regeneration assembly. That nitrogen is then directed to a steam cycle of a power plant, or to a generator-loaded hot gas expander to enhance the power output of the power plant. A second portion of the substantially liquefied nitrogen is stored and then may be vaporized and directed through a hot gas expander to enhance the power output of a power plant. A third portion of the substantially liquefied nitrogen may be sold to off-site customers.

Exemplary embodiments include an environmental remediation process, comprising the steps of mixing a substantially non-aqueous solvent and an alkaline feedstock from a feedstock source such that the solvent and alkaline feedstock form a solvent suspension, and mixing water and carbon dioxide with the solvent suspension in a reaction vessel such that a reaction occurs. The alkaline feedstock has a pH at or above about 5.6 and may have a pH at or above about 7.0. The reaction results in the rapid formation of carbonate, water and heat, and the resulting carbonate is substantially non-aqueous. The resulting carbonate precipitates out of solution, requiring no further chemical processing steps, falls toward the bottom of the reaction vessel, and accumulates at the bottom of the reaction vessel together with some substantially non-aqueous solvent.

In exemplary embodiments, the substantially non-aqueous solvent is methanol. The alkaline feedstock may be fly ash (or other alkaline material) containing calcium oxide, and the feedstock source may be produced as the waste stream at one or more of the following: coal-fired power plants, solid waste incinerators, wood processing facilities, bauxite refining facilities, acidic ash mixed with alkaline ash, acidic soil mixed with alkaline ash, mine spoil mixed with alkaline ash, or cement kilns. In exemplary embodiments, the alkaline feedstock may be Red Mud or contaminated soil. The environmental remediation process of the present invention may further comprise introducing a flue gas containing sulfur dioxide such that the resulting carbonate reacts with the sulfur dioxide to form calcium sulfite. The resulting carbonate may be used in iron smelting. In some embodiments, LFG is first sent to a reaction vessel where it reacts with a feedstock suspended in methanol, as outlined above and below. The reactions will convert the $CO_2$ in the LFG into carbonates, allowing a mostly methane stream to exit the reaction vessel and to be used as the fuel in a generator-loaded engine or turbine. The products of that combustion (which include $CO_2$) would be added to the LFG stream that is sent to the reaction vessel, adding more $CO_2$ to the reaction process. With an appropriate feedstock delivery rate, the entire $CO_2$ output of the landfill can be mitigated, yielding a zero-$CO_2$ power generating system at those landfills that use the methane for power production.

The sulfur compounds would form sulfites as described above/below. Thus, in this embodiment of the present invention, $CO_2$ and sulfur compound emissions from landfills can be mitigated. The feedstock that would provide the alkalinity needed to balance the $CO_2$ and sulfur compound output of the landfill would be converted from a large-volume toxic waste stream to a more concentrated stream of disposable metal salts and/or separately recoverable metal salts. Thus, the landfill's core function (its "purpose") would be enhanced to include waste stream mitigation, and valuable metals recovery.

In the embodiment outlined immediately above, the alkaline feedstock is delivered to the $CO_2$ (and sulfur compound) source. In other embodiments, such as at coal-fired power plants, the $CO_2$ and the feedstock are produced at the same place, allowing disclosed processes to receive all gas and solid components without the need to transport either the $CO_2$ or the feedstock.

In yet another embodiment, the $CO_2$ would be delivered as compressed (supercritical) gas or as liquid to a system deployed at a feedstock production source, such as an industrial facility that processes metals, which yields alkaline (toxic) metallic waste. Such waste may include, but is not limited to, spent solutions from plating bath and metal finishing, which may contain copper, zinc, and cadmium; alkaline solutions from aluminum surface coating and etching processes; waste sludge and slurry; and alkaline phosphates from the bonderizing of metals. (Bonderizing is a chemical process that helps prevent corrosion.) Instead of transporting such highly toxic waste streams for disposal, the waste would be processed at the source, per the methods described in the present invention, with the $CO_2$ required for the process delivered from an off-site $CO_2$ source, say, within 150 miles from the feedstock (and system deployment) site.

The "imported" $CO_2$, would be separated from its source, but not to "food grade" standards, using other well known $CO_2$ capture methods, but which lack cost-effective and proven "sequestration" options; then compressed and/or liquefied to achieve a density suitable for transport. In other words, the processes outlined in the present invention can use "impure" $CO_2$ which is available from any $CO_2$ carrying stream by one of several well-known $CO_2$ capture methods, especially in contexts where the capture and transport of $CO_2$ to a system deployment will be relatively low cost, compared to the value of the mitigation and metals recovery achieved at the feedstock source.

It should be noted that leaching is reduced in carbonated materials due to immobilization of the hazardous components. One significant finding of the inventor is that some metal material leaches into the liquid component of the slurry during a liquid type of carbonation. First, this finding suggests that the environmental burden due to heavy metals is reduced in slurry-carbonated solids in addition to metal immobilization through carbonate formation; second this opens a pathway for the reclamation of economically and geopolitically important metals, as well as for the isolation of toxic substances. The chemical nature of the leached materials is complex as a variety of species, such as salts, complexes, and even dissolved minerals are formed or extracted. Because suitable feedstock for disclosed processes can vary widely in composition, it is possible to optimize the processes for the carbonation of solids, or the recovery of metal species present in those solids, aiming for the best environmental and economic outcome. The reclamation of metal values, such as rare metal elements from feedstock, reduces the environmental footprint of metal ore production, a benefit that may be equal or higher in environmental impact to the reduction in carbon emissions at the point source of the $CO_2$. Economical levels of metals depend on the market value of the ore and the actual concentration found in the fly ash. For uranium this could be as low as 5 ppm.

Thus, exemplary embodiments include methods of recovering metals from alkaline waste, comprising the steps of mixing a substantially non-aqueous solvent and a waste stream containing an enriched metal in the form of a salt or a mineral such that the solvent and waste stream form a solvent suspension, and mixing water and carbon dioxide with the solvent suspension in a reaction vessel such that a reaction occurs. The reaction results in a composition comprising carbonate, one or more metal species, water and heat, the resulting carbonate being substantially non-aqueous. The resulting carbonate precipitates out of solution, requiring no further chemical processing steps, falls toward the bottom of the reaction vessel, and accumulates at the bottom of the reaction vessel together with some substantially non-aqueous solvent. The resulting metal species are suitable for production of refined metal, or hazardous waste disposal. "Refined metal" as used herein includes refined metal salts, metal compounds, metal in elemental form, ceramics (i.e., heat-treated metal species particulate) or metal alloys, and is not limited to a particular chemical or physical form of the metal. In exemplary embodiments, the substantially non-aqueous solvent is methanol. The waste stream may be fly ash, or one or more of acidic ash mixed with alkaline ash, acidic soil mixed with alkaline ash, mine spoil mixed with alkaline ash, or sewage sludge mixed with alkaline feedstock, and the enriched metal may be one or more of: arsenic, mercury, lead, uranium, vanadium, barium, strontium, zirconium, or nickel. The waste stream or "feedstock" may also be Red Mud, where representative enriched metal may be one or more of, but not limited to: barium, strontium, nickel, and zirconium in addition to aluminum, iron, or titanium.

Exemplary embodiments include an environmental remediation method comprising the steps of mixing a substantially non-aqueous solvent and a waste stream such that a solvent suspension is formed and mixing water and carbon dioxide with the solvent suspension in a reaction vessel such that a reaction occurs. The waste stream contains an alkaline feedstock and enriched metal species in the form of salts or minerals. The reaction results in composition comprising carbonate, one or more metal species, water and heat, the resulting carbonate being substantially non-aqueous. The resulting carbonate precipitates out of solution. For example, when fly ash with a CaO content is used as a feedstock, the precipitating carbonate that is recovered is analogous to limestone, and can be called "artificial limestone." The resulting metal species, which do not travel with the carbonate but with the wet solvent that is regenerated, are suitable for production of refined metal or controlled hazardous waste disposal. In this context, the term "hazardous waste" includes all metal compounds that cannot be recovered economically and, because of their toxicity, will cause environmental harm if not disposed of per accepted disposal protocols. In exemplary embodiments, the substantially non-aqueous solvent is methanol. The waste stream (or feedstock) may be fly ash or one or more of Red Mud, contaminated soil, mine spoil, acidic mine spoil mixed with alkaline feedstock, acidic contaminated soil mixed with alkaline feedstock, acidic ash mixed with alkaline feedstock, and any other alkaline waste products, and may be purposefully augmented by additional alkalis.

Accordingly, it is seen that a chemical process for securely and cost effectively capturing and sequestering carbon dioxide on site, at its source, at a large scale is provided in which carbon dioxide in the form of carbonic acid reacts with an alkali in a solution to foam carbonate, water and heat. It is also seen that processes are provided that convert industrial waste streams into environmentally benign materials, isolate valuable trace metals, and isolate toxic compounds for proper disposal. These and other features of the present invention will be appreciated from review of the following detailed description of the invention, along with the accompanying figures in which like reference numbers refer to like parts throughout.

BRIEF DESCRIPTION OF THE DRAWINGS

The foregoing and other objects of the invention will be apparent upon consideration of the following detailed description, taken in conjunction with the accompanying drawings, in which.

DETAILED DESCRIPTION

In the following paragraphs, embodiments of the present invention will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations on the present invention. As used herein, the "present invention" refers to any one of the embodiments of the invention described herein, and any equivalents. Furthermore, reference to various aspects of the invention throughout this document does not mean that all claimed embodiments or methods must include the referenced aspects. Reference to temperature, pressure, density and other parameters should be considered as representative and illustrative of the capabilities of embodiments of the invention, and embodiments can operate with a wide variety of such parameters. It should be noted that the figures do not show every piece of equipment, nor the pressures, temperatures and flow rates of the various streams. It should be further understood that the embodiments of methods and systems discussed herein and illustrated in the Figures are exemplary embodiments and those familiar with chemical and thermodynamic processes may find different arrangements to be optimal in different circumstances. Such variations and optimizations will not alter the basic principles taught by the present disclosure and are contemplated to be part of the present disclosure and the claims recited herein.

The examples of gas, liquid, and solid products produced by various embodiments of the present invention are not intended to be comprehensive. Some minor products of embodiments of the invention, including those that form temporarily and then dissolve, will not be discussed in great detail below but are understood to be included within the scope of the invention. Not all points of heat generation (or refrigeration generation) will be mentioned below, but it is understood that all worthwhile heat and/or refrigeration produced in embodiments of the invention will have the potential for heat recovery and potential use, thus reducing the total energy input required by the process. For example, in some embodiments any waste heat produced by the process described in the present invention, or available at the host site, may be used to drive an Ammonia Absorption Chiller, which would provide a portion of the refrigeration used to condense the solvent and/or to separate the solvent from the water.

Figure 1:
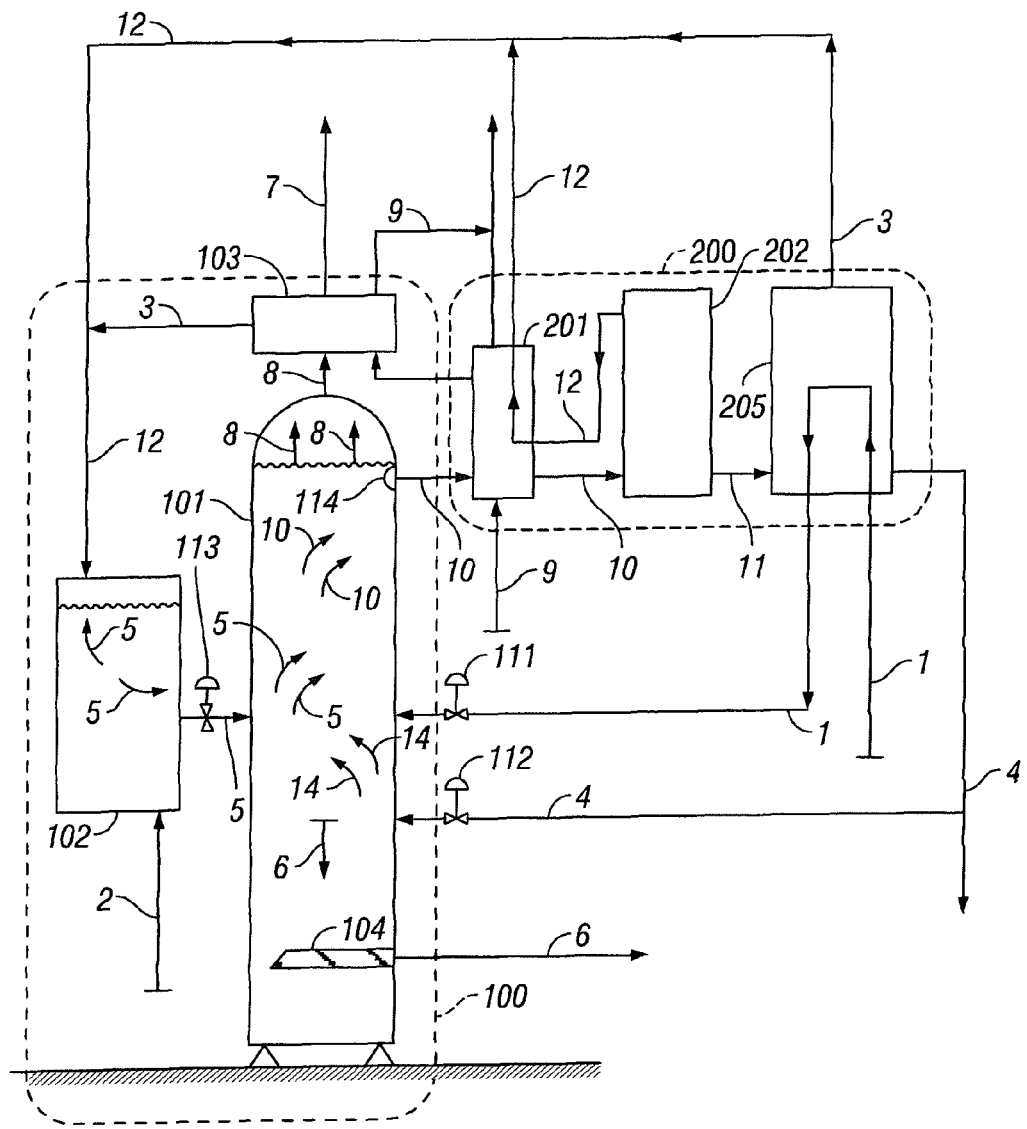
FIG. 1 is a process diagram of an embodiment of a carbon capture and sequestration system in accordance with the present invention.

FIG. 1 shows two major subsystems of an embodiment of the present invention, a carbon capture assembly 100, and a solvent regeneration assembly 200. Carbon capture assembly 100 includes reaction vessel 101 and mixing vessel 102 and preferably includes solvent condenser 103. The solvent regeneration assembly 200 will be described in detail herein in connection with FIG. 2. The system shown can be used with any power plant (or flue gas source) and with any type of exhaust gas, and is particularly well-suited for capturing and sequestering carbon dioxide from flue gas from coal-fired power plants. Flue gas from engines, such as at LFG sites, produce exhaust gas at close to 900° F. While most such engine-drive systems do not have heat recovery attachments, the low-grade heat content of the flue gas is a significant energy source for embodiments of the present systems and methods.

The chemical process of carbon capture and sequestration comprises contacting the $CO_2$+water and some temporarily formed carbonic acid 14 with the alkali 2 that is suspended in methoxide 5 so there is a reaction that results in the formation of precipitating carbonate 6, water-methanol solution 10 and heat. To begin with, $CO_2$-laden flue gas 1 and water 4 are introduced into the methoxide 5, both streams entering reaction vessel 101 separately at the same time. That separation allows full control over the flow rate of both streams and allows the water stream 4 to be adjusted in response to any minor amounts of water vapor contained in the flue gas. Reaction vessel 101 receives the methoxide suspension 5, which consists of alkali 2 and a substantially non-aqueous solvent 12, from the mixing vessel 102 through a first input 113, which is preferably an input valve. Reaction vessel 101 receives flue gas 1 through a second input 111 and water through a third input 112, both preferably input valves. The reactions between the $CO_2$+water (and small amounts of temporary carbonic acid 14) and the alkali 2 contained in the methoxide 5 occur rapidly (sometimes in less than a second), effectively converting the gaseous $CO_2$ into carbonates and byproducts of water and heat.

In a preferred embodiment, the carbonate 6 precipitates out of solution and is removed from reaction vessel 101 mechanically, using an auger 104 or any other device or system suitable for mechanically removing carbonate precipitates. In some embodiments, up to approximately 10% of the volume of the water-methanol solution 10 remaining in reaction vessel 101 will contain suspended carbonate, which will not fall to the bottom of the reaction vessel but will fall out of solution during the methanol regeneration process. The water resulting from the acid+base reactions forms a solution with the solvent. That water-solvent solution 10 is removed through a filter 114, which prevents larger solids from leaving the reaction vessel, and which will fall to the bottom of the vessel, where they will be mechanically removed. The method further comprises removing water-solvent solution 10 from reaction vessel 101 and separating the water from the solvent. In those embodiments that carry carbonates in the water-solvent solution 10, the carbonates will separate out with the water and can be recovered at several locations in the process. This solution 10 of water and methanol is withdrawn near the top of reaction vessel 101 at a warm temperature that reflects the optimum temperature of the reactions, which will minimize the time required for the reactions.

As a preliminary step, an alkali 2 is mixed with a solvent 12 in mixing vessel 102, to form a suspension 5. The alkali may be contained intrinsically within the feedstock that is to be treated, or it may be added to the feedstock to augment its alkalinity. Any of a number of alkalis known in the art can be selected for neutralizing the $CO_2$ in flue gas, producing their respective carbonates. The alkali may be a strong or a weak base, and may include such common bases as sodium hydroxide (NaOH) or potassium hydroxide (KOH) in powdered form, or hydrides such as magnesium-, potassium- or sodium hydride (MgH, KH, NaH), or anhydrous ammonia, or calcium oxide (CaO) found in the fly ash (and bottom ash) that is another byproduct of coal-fired or biomass power plants and boilers, or any other suitable alkali, natural or synthetic that will react with the $CO_2$.

One advantage of embodiments of the present invention is that it can be used to perform carbon capture and sequestration at large industrial scales. Employing the systems and methods described herein at facilities of all sizes allows use of multiple alkalis, resulting in their respective carbonates. An illustrative list, followed by the chemical symbol of each alkali and the carbonate produced when reacted with $CO_2$ and the chemical symbol of each carbonate, is provided here:

Ammonia (anhydrous), $NH_3 \rightarrow$ Ammonium carbonate, $(NH_4)_2CO_3$

Lithium Hydride, LiH$\rightarrow$Lithium carbonate, $Li_2CO_3$

Lithium Hydroxide, LiOH$\rightarrow$Lithium Carbonate, $Li_2CO_3$

Magnesium Hydride, $MgH_2 \rightarrow$ Magnesium Carbonate, $MgCO_3$

Magnesium Hydroxide, $Mg(OH)_2 \rightarrow$ Magnesium Carbonate, $MgCO_3$

Potassium Hydride, KH$\rightarrow$Potassium Carbonate, $K_2CO_3$

Potassium Hydroxide, KOH$\rightarrow$Potassium Carbonate, $K_2CO_3$

Sodium Hydride, NaH$\rightarrow$Sodium Carbonate, $Na_2CO_3$

Sodium Hydroxide, NaOH$\rightarrow$Sodium Carbonate, $Na_2CO_3$

One embodiment uses potassium hydride (KH), possibly in combination with other alkalis. $MgH_2$ and ash could be used in combination with the KH to increase the $CO_2$ capture rate. The hydrides of potassium, sodium, magnesium, (KH, NaH, and MgH, respectively) are less expensive than their hydroxide counterparts (KOH, NaOH, $Mg[OH]_2$), and yield a larger amount of carbonate per unit of hydride than the hydroxides, making the hydrides more economical. Such combinations of alkalis would require multiple mixing vessels and multiple reaction vessels. Some hydrogen may also form as a by-product of using certain hydrides. For example, about 930 L of hydrogen will result from NaH and about 560 L of hydrogen will result from KH for every two pounds of hydride dissolved in methanol. Such an $H_2$ stream would not be vented, but would be used as fuel in one of several possible locations in embodiments of the invention. For example, the $H_2$ stream can be sent directly to the combustion chamber of the power plant, or it can be burned in a supplemental heater that provides additional heat to the $N_2$ stream that is used for enhanced power output. The selection of alkalis and the resultant carbonates will depend on the markets for those carbonates and the relative costs of the alkalis when compared to the value of the carbonates.

A preferred embodiment uses the alkali present in fly ash, the fine powder recovered from flue gas at coal-fired and biomass power plants or coal-fired and biomass boilers, prior to the release of the flue gas to the atmosphere. Similarly, bottom ash, resulting from the remains of the coal or biomass that does not travel up the flue, is a product for which uses are sought, but which is still a significant waste stream. The following discussion on ash covers both fly ash and bottom ash, which have similar chemical components, and all other alkaline ash from any source. This also extends to predominantly solid wastes from cement kilns, Red Mud, in brief any material covered in the basic definition of a feedstock (vide infra).

Much of the ash produced at coal-fired power plants does not have a use. Most of it is transported to landfills for disposal, or for other low-value applications. Ash from lignite, a widely-used type coal, contains 15-45% $SiO_2$ (sand), 20-25% $AlO_3$ (aluminum oxide), 4-15% $Fe_2O_3$ (iron oxide) and 15-40% CaO (calcium oxide), with up to 5% unburned carbon. Sub-bituminous coal will produce fly ash with lesser proportions of CaO (5-30%), which can also be used as an alkali source, but requiring larger amounts of ash to produce similar carbon capture-results. The removal of the iron oxide by magnetic means, preferably when the ash subsequently is suspended in methanol, can serve to increase the amount of CaO in the methanolic suspension, yielding another profitable byproduct (iron oxide) and reducing the weight and transport costs of the final carbonate-laden solid product stream by the removal of the relatively heavy iron. The CaO contained in fly ash is the same alkali that one can purchase as lime, but in this context is a byproduct of the burning of coal that contained calcium carbonate. Thus, the CaO is obtained from the ash with no additional $CO_2$ emissions beyond what the power plant normally emits. By contrast, buying manufactured CaO would increase the carbon footprint of this process because manufacturing CaO results in large $CO_2$ emissions.

One embodiment of the carbon capture and sequestration method hosts the ash and the $CO_2$-containing flue gas 1 in methanol 12, substantially limiting the amount of water in reaction vessel 101. This allows the reaction to yield a dryer and more controllable (as to size and configuration) end product. In this preferred embodiment, the end product will be uniformly sized granules, requiring little or no post-dryer crushing, yielding an "artificial limestone" that is a suitable agricultural lime substitute, while minimizing the amount of input energy required by the process.

The glass-like ash may benefit from a rapid cooling process that cracks the microscopic ash particles, thus facilitating the reaction of the alkali in the ash with the $CO_2$ and water delivered to the reaction vessel by streams 1 and 4. That rapid cooling preferably includes first warming the ash and then rapidly cooling it in deeply chilled methanol, thus cracking each glass-like bead of microscopic ash. If the reactions occur in warm methanol (as is likely), then the quenching of the ash stream can occur first in one vessel, followed by the mixing of the methanol plus ash solution with warmed methanol in a separate reaction vessel. The heat needed to warm the ash before the rapid cooling may be delivered from one of the many heat recovery points in the process.

It is preferred that the acid+base reaction occur in a host liquid having the alkali, or base, in solution, and allow for easy contact between that base and the $CO_2$+water (plus small amounts of temporary carbonic acid) that is formed when $CO_2$ and water are introduced to alkaline-laden solvent. Therefore, preferred embodiments use a substantially non-aqueous solvent to host the reaction. This is accomplished by withdrawing from the top of reaction vessel 101 the water-methanol solution 10, at the same rate as the reaction produces water, and replacing the water-methanol solution 10 with an equivalent volume of rich (i.e., substantially water-free) methoxide 5. The amount of water inflow to the reaction vessel is dependent on the water content of the flue gas and the quantity of water that might remain in solution in the methanol from prior inflow of flue gas.

In addition, the water that is a product of the acid+base reaction needs to be withdrawn from reaction vessel 101 at a sufficient rate so as to prevent the methoxide 5 from hydrolyzing. The mostly dry flue gas 1 is bubbled through the methoxide 5, along with an appropriate amount of water (stream 4), allowing the $CO_2$ to react with the alkali and temporarily form small quantities of carbonic acid 14, which also reacts with alkali 2 that is held in solution 5 by the solvent 12. It is preferred that the flue gas 1 enter reaction vessel 101 at enough pressure, so that the flue gas 1 can rise through the host methoxide 5 and allow the unreacted portion of the flue gas (mostly $N_2$) to leave reaction vessel 101, as a mostly $N_2$ and vaporized methanol stream 8, which is recovered by condensation in solvent condenser 103. Accounting for pressure drop along the pre-cooling route of the flue gas, the present invention seeks to receive the flue gas at more-than atmospheric pressure, but not likely more than 20 pisa, at, say, approximately 17 psia.

In a preferred embodiment, the non-aqueous solvent is an alcohol and most preferably, methanol. However, any other suitable non-aqueous solvent that will tolerate some significant amount of alkali to be dissolved in it, and will force the precipitation of any salt that is produced in the classic acid+base reaction may be used. Ethanol is a somewhat costlier alternative, which may be selected if, for example, the process is used to capture and sequester $CO_2$ produced at an ethanol plant. In that context, the ethanol will be available at the equivalent of a wholesale price, and make-up ethanol will not require any shipping. The purpose of the solvent is to allow the acid+base reactions to occur within a substantially dry liquid, thus avoiding the formation of salt water or carbonates suspended in water, and avoiding an end product with a high percentage of water that must be driven off.

The alkali 2 mixes with the methanol solvent 12 to form methoxide 5, a solution of methanol and any appropriate hydride or hydroxide base where the base is in suspension. The following is one example of a generic chemical equation for the mixing of an alkali (KH, or potassium hydride) with methanol: $2\,KH + MeOH$ yields $2MeOK + H_2$. The methoxide may be refrigerated to recover and counter-act the heat of reaction that will occur when some alkalis are introduced into methanol. The choice of how cold the methoxide should be will depend on which alkali is selected and which carbonate will be the end product of the reaction, and by the methods selected for controlling the temperature of reaction vessel 101, and thus limiting the boil off of methanol from the reaction vessel.

Mixing the alkali 2 with ambient temperature methanol 12 in mixing vessel 102 creates heat as the two compounds interact, and will produce an ionic solution of methoxide 5, which may include solvated metal hydroxide. The heat of reaction in the resultant solution, which typically is in the range of about 225° F. to about 300° F., may be recovered and used to warm other segments of the process. It should be noted that some dimethylcarbonate (DMC) will also form in mixing vessel 102, but will subsequently decompose. After heat recovery, the methoxide 5 is sent to reaction vessel 101 to host the incoming streams of water 4 and mostly dry flue gas 1, which is bubbled through the methoxide 5. The flow rate of the methoxide 5 into reaction vessel 101, as well as the outflow of water-methanol solution 10 from reaction vessel 101 to cryogenic drying vessel 202 (via first heat exchanger 201) and to the hot distillation column 205, will depend, first, on the flow rate of the flue gas 1 and the $CO_2$ content of the flue gas. Secondly, the flow rates will be strictly controlled so as to never allow more than approximately 10% water in the reaction vessel because a methoxide medium with a larger moisture content will not as readily precipitate the carbonate salt.

Methoxide 5 enters reaction vessel 101 into which the flue gas stream 1 and water 4 are introduced. Some embodiments may use multiple reaction vessels in series to allow for the constant flow of flue gas. A preferred reaction vessel has a height of approximately 40 feet and may be made of stainless steel or appropriately coated carbon steel, or any other material that can tolerate acids, bases, water and heat without corroding. Reaction vessel 101 is fluidly connected to mixing vessel 102 such that the alkali-solvent suspension, here methoxide, enters the reaction vessel through a first input. As discussed in more detail herein, flue gas stream 1 arrives in reaction vessel 101 through a second input having given up some its heat content in a hot distillation step associated with the regeneration of the methanol. The fundamental chemical process driving the reactions in the vessel can be summarized by the following equations:

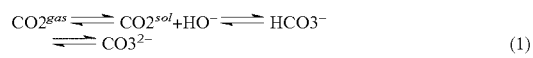

(1)

(2)

$pka_1 = 3.60$ at 25° C.

(3)

$pka_2 = 10.33$ at 25° C.

The first step in (1) above is the physical dissolution of carbon dioxide gas in the substantially non-aqueous solvent. This dissolution is reversible, as indicated by the double arrows. The second step in (1) is the capture of $CO_2$ by even small amounts of water or base to form small amounts of transient carbonic acid, which is represented best as solvated $CO_2$, $CO_2^{sol}$ and carbonate ions. Ion formation depends on the alkalinity of the solution. The reactions are fast, virtually instantaneous. The availability of $CO_2^{sol}$ is determined by the partial pressure ($p_{CO2}$) of $CO_2^{gas}$ in the gas column above the liquid. The shifts to and between ionic forms of the carbonate system can be described with the ionization steps shown in (2) and (3). The pKa values are the negative logarithm of the dissociation constants of the two acids.

Salts of varying solubility can be formed under the right conditions. Common carbonates are calcium carbonate, sodium carbonate, potassium carbonate and magnesium carbonate. Of the bicarbonates, the most common stable species is sodium hydrogen carbonate ($NaHCO_3$).

Insoluble carbonates are removed from the vessel as metallic salts (e.g., calcium carbonate or potassium carbonate) that precipitate to the bottom, thus allowing the reaction to continue. The alkalinity of the solution and the solubility of the carbonates in the solvent determine the rate of carbonate formation and precipitation. Therefore the actual operation of the reaction can be optimized by controlling the alkalinity of the solvent and the temperature, pressure and flow rates of the various streams, relative to the solubility of the selected carbonate product. Those familiar with the art and science of chemical processes may vary and optimize the process conditions and the arrangement of components to improve the efficiency of disclosed processes as measured by the rate of alkali neutralization relative to any required energy input.

Preferably, the water produced from the acid-base reaction should not exceed approximately 10% of the volume of the methanol in the reaction vessel. Water control is achieved by constantly drawing off water-solvent solution 10 from the reaction vessel and replacing it with pure, regenerated methanol. This solvent regeneration process is discussed in detail below.

The reaction of alkali 2 and carbonic acid 14 produces carbonate 6 that precipitates to the bottom of reaction vessel 101, where it is removed by auger 104 or any other device or system that can mechanically remove precipitated carbonate. If KH is used as the alkali, some portion of the carbonate 6 will likely stay in solution in the methanol, and will leave with the water-methanol solution 10 and fall out later during cryogenic drying. The removed material may undergo drying by recovered heat from elsewhere in the process, yielding a fine powder or pellets. The carbonate 6 that falls to the bottom of reaction vessel 101 may carry with it a small amount of methanol, but preferably will not carry water. The reaction will cause the water-methanol solution product 10 to rise upward in reaction vessel 101, while the precipitating carbonate 6 will fall toward the bottom.

Thus, the design of the reaction vessel takes advantage of the rising liquid and flue gas streams and the falling carbonate. For example, the methoxide 5 and cool flue gas 1 enter near the bottom of reaction vessel 101, while the warmer water-methanol solution 10 is withdrawn near the top, with the inert gases ($N_2$, and in some instances $O_2$) moving on to further processing steps in nitrogen liquefaction assembly 300, shown in FIG. 3 and in more detail in FIG. 4. Any methanol (in the form of water-methanol solution 10) that leaves reaction vessel 101 with the carbonate is allowed to evaporate. The dry carbonate would be sent to end-users for use as fertilizer, a lime substitute, in mine reclamation, road fill, or other industrial uses. A substantial percentage of the acidic oxides of nitrogen contained in the flue gas stream will also react with the alkali in the methoxide, yielding various salts containing nitrogen, including but not limited to nitrides, thus reducing the emissions from the power plant.

The carbonate 6 produced from the reaction of carbonic acid 14 and alkali 2 depends on the selected alkali. In the case of calcium as the alkali, this would be artificial limestone, which can be used as a substitute for lime in agricultural fertilizer, or in steel making, oil drilling, diapers, and glass making. Another potential product is high in magnesium carbonate, which may be used as a fertilizer as a substitute for dolomitic limestone, allowing for the avoidance of liming, resulting in the avoidance of $CO_2$ emissions by reducing the $CO_2$ emitted during lime production. Carbonate high in potassium is another possible product that can be used as a fertilizer and also avoids liming. Other potential end products of embodiments of the invention may include silicon nitride ($Si_3N_4$), calcium nitride ($Ca_3N_2$), or magnesium nitride ($Mg_3N_2$), when metals are burned in pure nitrogen. The separation of argon (as liquid argon) from the liquid nitrogen product stream is especially appealing because the nearly 1% argon content of the flue gas will yield a high-value liquid argon stream if a cold distillation column is included in the $LN_2$ production loop.

With the $CO_2$ removed from the flue gas 1 and chemically converted to carbonate 6, the remaining portion of the flue gas is mostly nitrogen. Stream 8, which contains nitrogen and some methanol, leaves the top of reaction vessel 101. The hotter the reaction, the more vaporized methanol will leave with the $N_2$ gas. Reaction temperatures of more than 150° F. will cause too much methanol to leave the vessel with the $N_2$. Thus, the heat of reaction needs to be controlled. For example the inlet methoxide stream 5 to reaction vessel 101 may be pre-cooled. Alternatively, reaction vessel 101 may be cooled internally by a heat exchanger suspended near the top of the vessel, for example, using a cold $N_2$ stream 9, to cool the liquid in the reaction vessel to maintain its methanol content in a condensed (liquid) state, allowing the remaining $N_2$ vapor to move on to nitrogen liquefaction assembly 300 for liquefaction. Preferably, the reaction is allowed to reach near 150° F., tolerating some methanol boil off, but recovering that methanol immediately after it leaves reaction vessel 101 in solvent condenser 103.

The methods of controlling the temperature in the reaction vessel can include cooling the inlet streams (methoxide, water, etc.) and/or cooling the liquids in the reaction vessel by an internal heat exchanger, and/or a combination of those techniques. Those options are not illustrated in FIG. 1. Those familiar with the engineering of such heat control systems would select an optimal method. The extent to which the reaction vessel needs to be cooler than 150° F. will be determined by thermodynamic calculations that optimize the rate of the reaction but without causing excessive methanol boil off from the reaction vessel.

The stream that leaves solvent condenser 103 is flue gas with mostly $N_2$ 7, but it may also include argon, and low amounts of $O_2$, depending on the source of the flue gas. Trace amounts of water or $CO_2$ (parts per million) would be removed in a molecular sieve 305 (shown in FIG. 4) prior to the liquefaction of the $N_2$ stream 7 as discussed below. Much of the $N_2$ can be cost-effectively compressed and chilled, and thus liquefied by processes known in the art, to yield liquid nitrogen ($LN_2$) of a relatively high purity, but at much lower costs than can be produced at standard air separation plants. This process is performed by nitrogen liquefaction assembly 300, shown in FIG. 3 and FIG. 4.

Figure 2:
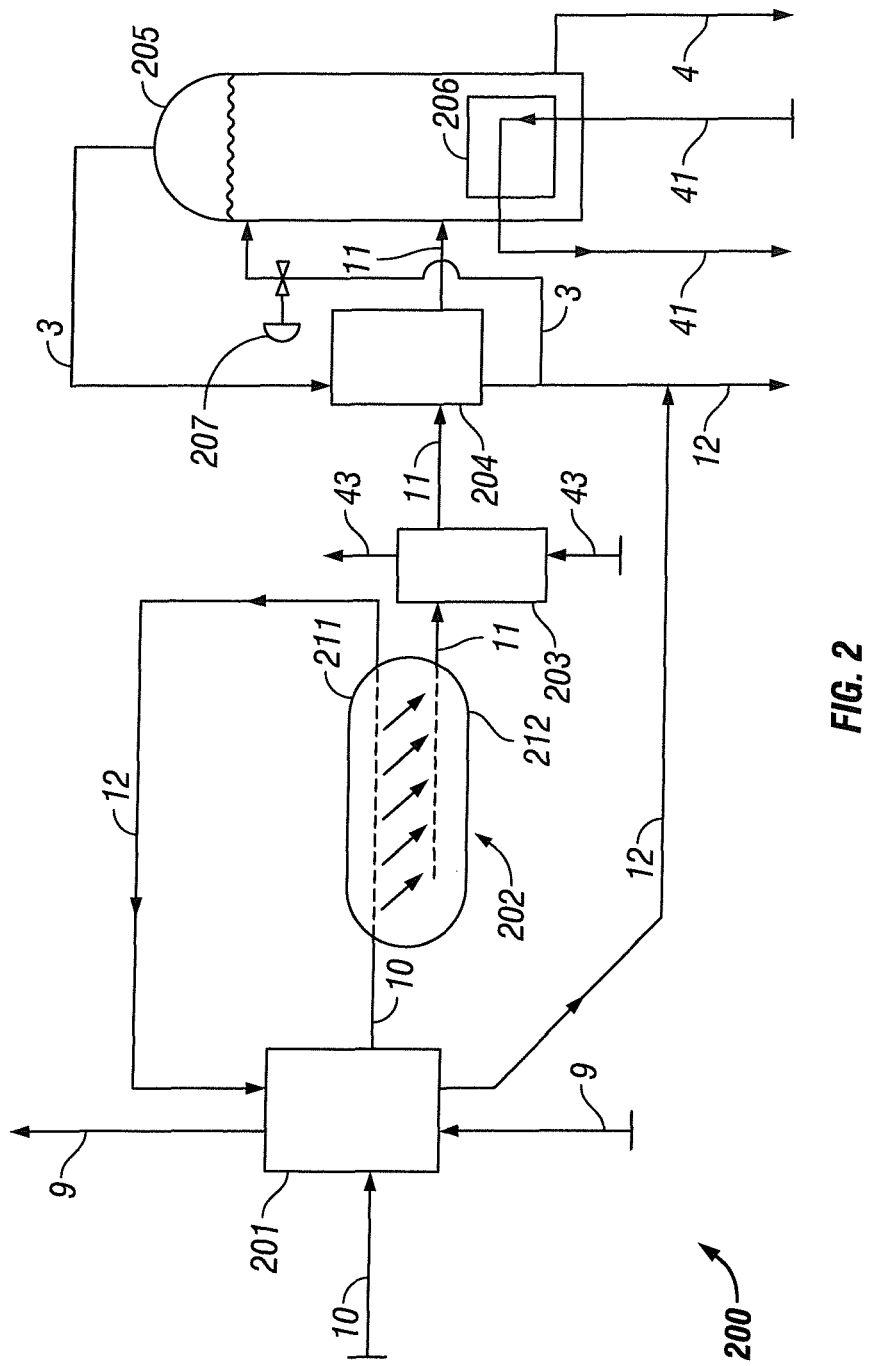
FIG. 2 is a process diagram of an embodiment of a solvent regeneration assembly in accordance with the present invention.

Turning to FIG. 2, solvent regeneration assembly 200 is shown in more detail. Solvent regeneration assembly 200 is fluidly connected to reaction vessel 101 and comprises first heat exchanger 201, cryogenic drying vessel 202 fluidly connected to the first heat exchanger, and hot distillation vessel 205 fluidly connected to the first heat exchanger. Additional heat exchangers may be used and will be described herein. Water-methanol solution 10 is sent to first heat exchanger 201, where it is deeply chilled by heat exchange with liquid $N_2$ 9 that has been pumped (by a cryogenic pump, not shown) to a high pressure, e.g., approximately 800 psia, or any other pressure suitable for the power enhancement features discussed below. The deeply chilled water-methanol solution 10 is then sent to cryogenic drying vessel 202, where the now nearly frozen water it contains (a "slush" of water with small amounts of methanol) falls to the bottom of the cryogenic drying vessel 202, allowing that mostly water stream 11 to be drawn off from the bottom 212 of cryogenic drying vessel 202, and leaving a mostly methanol stream to be drawn off from the top 211 of the vessel. If KH is being used as the alkali, some of the carbonate will fall out in the cryogenic drying vessel 202.

In some embodiments, water-methanol stream 10 will carry carbonates in solution with the methanol. Those solids will precipitate toward the bottom 212 of the cryogenic drying vessel 202 and would be removed by mechanical means from the bottom of the vessel, with water-methanol stream 11 removed as mostly water from a higher point on vessel 212. As far as technically feasible, neither streams 11 nor 12 will carry any solids, with them as they move on in disclosed processes.

Next, the mostly water stream 11 travels on to the second heat exchanger 203, which is preferably an ambient air heat exchanger, for warming. Other sources of heat may include various heat-carrying streams, such as stream 7, in FIG. 1, after that stream leaves solvent condenser 103. That choice would serve to pre-cool the $N_2$ stream before it arrives at nitrogen liquefaction assembly 300 for liquefaction. From second heat exchanger 203, the mostly water stream 11 enters third heat exchanger 204, where it is further warmed by methanol vapor 3 that is driven off from the hot distillation vessel 205. For the sake of clarity, third heat exchanger 204 is shown directly between second heat exchanger 203 and distillation column 205. A fully engineered version of the process will likely place the third heat exchanger 204 above distillation column 205, allowing the reflux solvent stream that travels through control valve 207 to fall into the column by gravity. Alternatively, a small pump would move the reflux stream from 204 to 205.

The methanol vapor 3 used in third heat exchanger 204 preferably is approximately 150° F. and higher, substantially pure methanol vapor. Water may be recovered from hot distillation vessel 205 and used to warm the $N_2$ stream as it leaves first heat exchanger 201, on its way to its power enhancement function in power plant 400, the power cycle which produces the flue gas in the first place, and which powers the nitrogen liquefaction assembly 300. Methanol stream 3, which is a vapor at this point, is condensed to a liquid by the mostly water stream 11, allowing recovered methanol 12 to be sent back to mixing vessel 102 for further methoxide production. The resulting methoxide suspension may contain some water.

That stream 12, (with little water content) is removed from the top of cryogenic drying vessel 202, as a dry methanol and returned through first heat exchanger 201 (recovering its coldness) and then joining the return stream that exits third heat exchanger 204, with the combined mostly-methanol stream 12 sent back to mixing vessel 102. The return flow of stream 12 (mostly dry methanol) travels through first heat exchanger 201, helping the liquid $N_2$ to cool the water-methanol stream 10 from the reaction vessel 101.

The mostly water stream 11 that leaves cryogenic drying vessel 202 and is warmed in second heat exchanger 203 and third heat exchanger 204, is heated in hot distillation vessel 205, driving off its limited content of methanol vapor and allowing pure water to leave the bottom of the hot distillation vessel 205. The heat source for this distillation is the hot flue gas 41, which travels through re-boiler 206 at the bottom of hot distillation vessel 205. The hot flue gas gives up much of its heat in this step, but still has enough remaining heat that can be recovered for use elsewhere. Most of the recovered water 4 that leaves hot distillation vessel 205 is sent back to reaction vessel 101 so that the $CO_2$ in the flue gas can form carbonic acid 14, as illustrated in FIG. 1. Any extra water that may be produced can be sent through one or more layers of activated charcoal filtration, after it leaves hot distillation vessel 205, allowing that water to be potable. Alternatively, excess recovered water may be sent to the steam cycle of the power plant as a source of make-up water, replacing water lost in the steam cycle. Flue gas from natural gas fired power plants will have a higher water content, requiring less of the water 4 recovered from hot distillation vessel 205 to be returned to reaction vessel 101 to form carbonic acid with the $CO_2$ in the flue gas.

Low-pressure methanol vapor 3 leaves the top of hot distillation vessel 205 (also known as a distillation column). The heat of that vapor is used to pre-warm the cold (mostly water) stream 11 that is sent to the hot distillation vessel 205. That heat exchange causes the methanol vapor 3 to condense. A portion of the condensed methanol stream is sent back to the top of the hot distillation vessel 205 as a type of reflux stream, which helps vaporize the methanol in the mostly water mixture below it. Preferably, the portion of the condensed methanol stream sent back to the top of hot distillation vessel 205 is approximately 10% of the stream. Valve 207 is shown on the reflux line, prior to the stream's entry into the vessel.

The liquid $N_2$ stream 9 travels through first heat exchanger 201, deeply chilling (to between about −50 and −80° F.) water-methanol stream 10. The flow rate of the liquid $N_2$ 9, through first heat exchanger 201, controls the exit temperature of the vaporized liquid $N_2$ (now $N_2$). In a preferred embodiment, the vaporized $N_2$ is cold enough to serve as the refrigerant in solvent condenser 103 that condenses the methanol contained in the mostly-$N_2$ stream that leaves reaction vessel 101 (as seen on FIG. 1). That side-loop of $N_2$, having helped condense the methanol in the outflow stream 8 from reaction vessel 101, rejoins the high-pressure $N_2$ stream that leaves first heat exchanger 201, and is sent on to do power enhancement work in the basic power production cycle. Solvent condenser 103 recovers the heat content of the $N_2$+methanol stream 8 that leaves the warm reaction vessel 101, and transfers that heat to the cool $N_2$ side-stream 9 that leaves first heat exchanger 201, and which rejoins the main $N_2$ stream 7, on its way to the power cycle. This allows the acid+base reaction in the vessel to occur at the hottest conditions, yielding valuable low-grade heat that is transferred to the $N_2$ stream 7, shown rejoining the main $N_2$ stream that left heat exchanger 201. The warming of that $N_2$ stream that is traveling from 201 toward subsystem 400 is achieved by the cooling of $N_2$ stream 7 that leaves solvent condenser 103, on its way to liquefaction in subsystem 300.

It should be noted that the distillation of the water-methanol solution 10 that is drawn off from reaction vessel 101 can occur in several ways, including by heat (such as from the heat content of the flue gas), by heat augmented by a partial vacuum to draw off the methanol vapor from the hot distillation vessel 205, or by vapor recompression methods. However, all those methods would require more heat than is available in the flue gas. Instead, the present invention "pre-distills" the wet methanol stream and deeply chills the water-methanol solution 10 such that the denser water travels to the bottom of a container and allows that saturated methanol stream to be further distilled by any one or a combination of the above methods.

A preferred embodiment shown in FIG. 2 relies on off-peak power stored in the form of liquid $N_2$ to achieve the distillation (regeneration) of the water-methanol solution 10. The cold distillation step yields a mostly-water stream, out of which the remaining methanol is distilled by heat. The preferred two-step (cold and hot) regeneration process requires much less heat to distill the water-methanol solution 10 if the ratio of water is very high relative to the ratio of methanol, as is the case for the arriving mostly water stream 11 that is sent to hot distillation vessel 205. The net energy required to regenerate the methanol will be less when refrigeration is included in embodiments of the invention, because the wider temperature range (between the hot and cold sides of the distillation) allow for a good deal of heat and cold recovery. Additionally, the production of liquid $N_2$ will yield a good deal of low-cost refrigeration. It should be noted that FIG. 2 does not show every possible heat recovery step that may optimize the efficiency of the process and shows only one control valve. Other valves, gauges, sensors, instruments and pumps are not shown. Other refrigeration sources, such as cold ammonia, produced by an Ammonia Absorption Chiller powered by waste heat and/or by a fired heater, can also be used to substitute for the refrigerant streams shown on FIG. 2.

Figure 3:
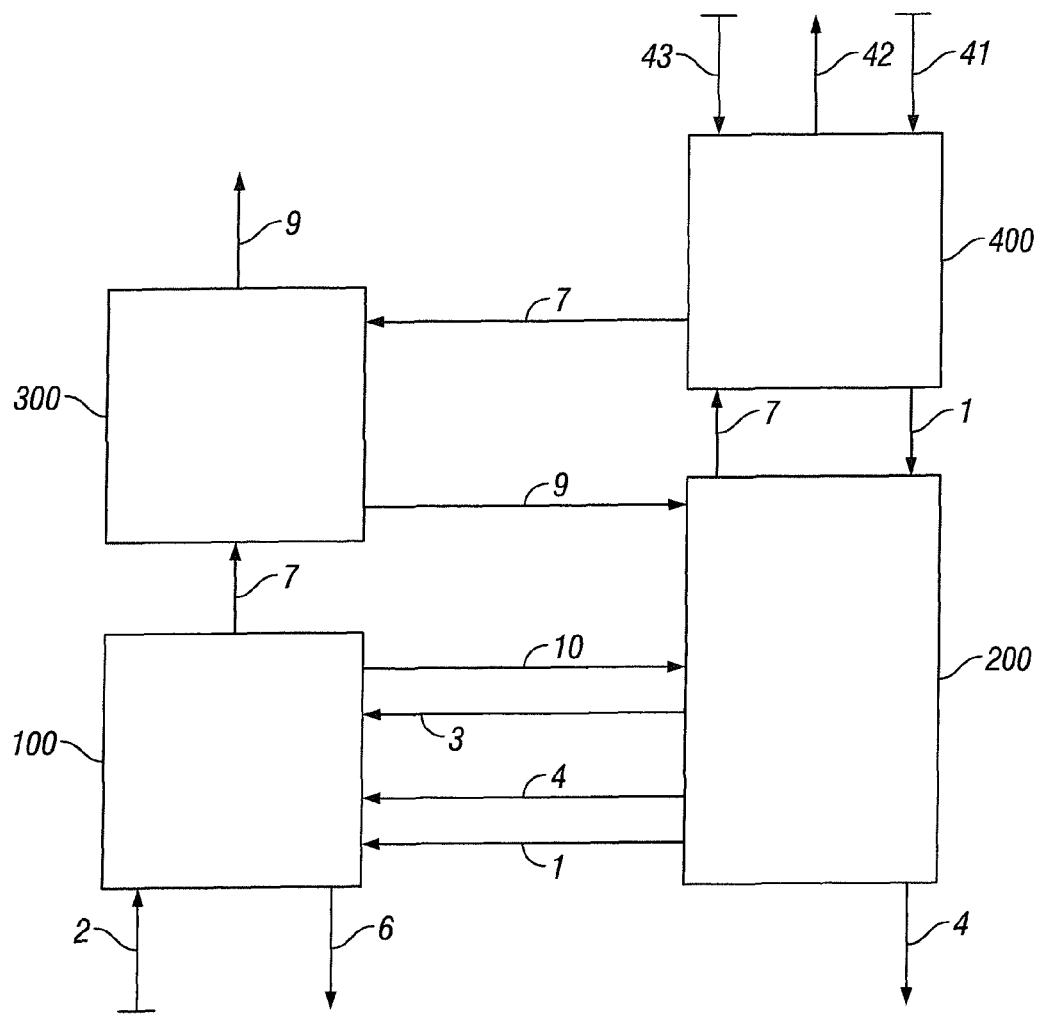
FIG. 3 is a process diagram of an embodiment of a carbon capture and sequestration system in accordance with the present invention integrated with a power plant.

FIG. 3 shows an embodiment of a carbon capture and sequestration process and system integrating several subsystems, including the inflow and outflow streams to a power plant, as well as the streams between the subsystems. These include carbon capture assembly 100, solvent regeneration assembly 200, nitrogen liquefaction assembly 300 and the power production assembly 400. This last part can include coal-fired and biomass steam cycles, natural gas fueled combined cycles, landfill gas-fired or anaerobic digester-fired plants, and any other hydrocarbon fueled, $CO_2$-emitting power production systems.

$LN_2$ production occurs in nitrogen liquefaction assembly 300 with mostly $N_2$ as the feed gas. In one example, the $LN_2$ production stream at a 500 MW coal-fired power plant will be approximately 30,000 tons per day. Those 30,000 tons per day include about 0.9% argon, which is also valuable, and which is separated from the $LN_2$ and used to generate income. In a preferred embodiment, the $LN_2$ is divided into three portions. A first portion is sold as a high-value product to off-site end users, for refrigeration applications and as a product that is used in oil and gas fields to move such resources to (and up) the well casing.

A second portion is used to regenerate the methanol by cryogenic drying, as shown in FIG. 2. That same $N_2$, after it is vaporized by heat exchange, is sent as a high pressure stream into the steam cycle of a power plant, increasing the mass flow through the steam turbine, or to a separate hot gas expander which is generator-loaded, thus enhancing the power output by some 6.5%, without the use of additional fuel. The high-pressure of the $N_2$ stream is achieved by first pumping the $LN_2$ to pressure, and the heat is absorbed in the high-pressure stream through the various heat recovery steps shown in FIG. 2 and discussed herein.

Sources of heat provided by embodiments of the invention for warming the high-pressure $N_2$ vapor include the following: warm water-solvent solution 10 that leaves reaction vessel 101 on its way to regeneration, as shown in FIG. 1, where heat exchange occurs between $N_2$ stream 9 and water-solvent solution stream 10 in heat exchanger 201; warm $N_2$ leaving the reaction vessel 101, as shown in FIG. 1, where $N_2$ stream 9 is warmed by the methanol-containing $N_2$ stream 8 in solvent condenser 103; the remaining heat in the flue gas 1 after it gives up some of its heat in the hot distillation column 205; heat contained in the recovered water 4 from the hot distillation column 205; heat produced by the ionic reaction between the selected alkali 2 and the methanol 12 during the making of methoxide 5 in mixing vessel 102; the condensation of steam in the power cycle, normally performed by a cooling tower, which is replaced by the cold $N_2$ stream; and in natural gas fired, combined cycle power plants, the heat absorbed from using cold $N_2$ as a cooling stream to chill the ambient inlet air to the gas turbine.

A third portion of the daily $LN_2$ production is stored in one or more cryogenic storage tanks 307, and released during the peak power demand period to further enhance the power production cycle. The release of that stored energy occurs by first pumping the $LN_2$ to pressure, preferably using a cryogenic pump, then vaporizing it with waste heat from elsewhere in the process, then sending the high-pressure hot $N_2$ stream through a generator-loaded hot-gas expander. That power output will increase the peak period power output by another approximately 5%, which, combined with the 6.5% power increase produced during the rest of the day, yields a total power boost of about 11% during the peak output period when the power is most valuable. The $LN_2$ used for that power enhancement embodiment is preferably made at night using off-peak power, and its storage for later power release constitutes a utility-scale power storage mode, without batteries, fly wheels or compressed air cavern storage systems.

This storage and release mode, with outflow during peak power demand periods, constitutes a power storage strategy that converts low-cost liquid nitrogen produced as a byproduct of the $CO_2$ capture process and converts that recovered nitrogen stream into high-value peak period power, e.g., similar to embodiments described in U.S. Pat. Nos. 7,821,158 and 7,870,746, which are each hereby incorporated by reference in their entireties. The generator-loaded hot gas expander that converts the hot, pressurized nitrogen gas into electric power may be the same expander that converts the first portion of nitrogen that was warmed in the methanol regeneration process.

Nitrogen stream 7 is already separated from the air that was initially used to combust the fuel used in the power plant 400 (with the $O_2$ content of the air used to combust the fuel), and is also separated from the $CO_2$ contained in the flue gas that resulted from the combustion of fuel in air. Any trace amounts of water and $CO_2$ remaining in the nitrogen stream 8 that leaves reaction vessel 101 can be removed by molecular sieve 305, preferably containing zeolite. The water and $CO_2$ content of the $N_2$ stream will be substantially less than that of ambient air, requiring a smaller mole sieve adsorber, or one that is regenerated less often.

Figure 4:
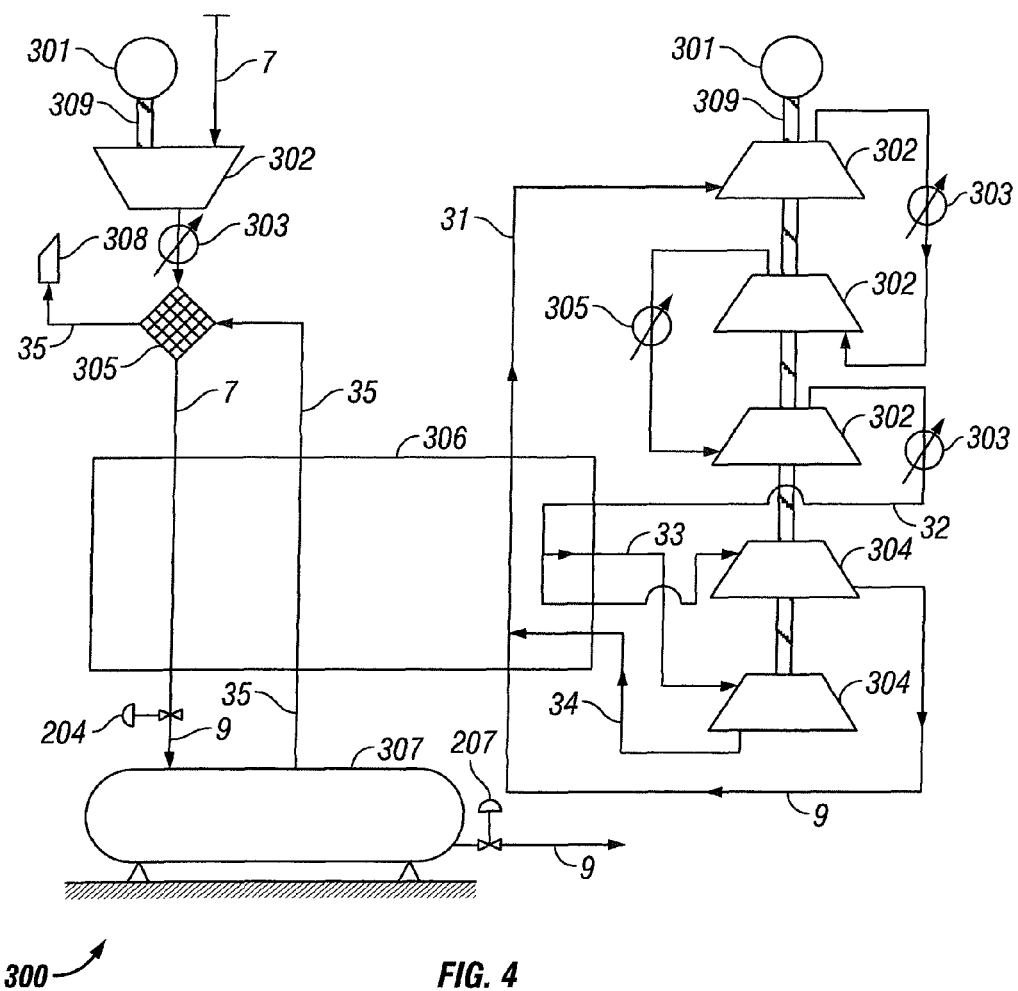
FIG. 4 is a process diagram of an embodiment of a nitrogen liquefaction assembly in accordance with the present invention.

Referring to FIG. 4, nitrogen liquefaction assembly 300 is shown in more detail. FIG. 4 illustrates $N_2$ liquefaction using a separate $N_2$ loop as the refrigerant, which cools the $N_2$ stream that leaves carbon capture assembly 100 in a cryogenic heat exchanger 306. $N_2$ stream 7 is first compressed to moderate pressures, e.g., approximately 80 psia, in several stages, as represented by multi-stage compressor 302, which is driven by a motor 301 connected to the compressor by a drive shaft 309. After heat recovery in one or more inter- and after-coolers 303, the compressed $N_2$ moves through molecular sieve 305. FIG. 4 shows several locations where the heat of compression is recovered in heat exchangers (inter- and after-coolers) and is used to provide heat for other portions of the carbon capture and sequestration process. The compressed $N_2$ stream is sent to cryogenic heat exchanger 306 where it is chilled to approximately $-280°$ F. by heat exchange with the refrigerant $N_2$ streams, shown as 9. The chilling causes the stream to form a mostly liquid phase, which is sent through a pressure letdown/control valve 207 between cryogenic heat exchanger 306 and storage apparatus 307, preferably a cryogenic liquid storage tank in which the resultant $LN_2$ is stored.

The pressure letdown through valve 204 allows more than 90% of the deeply chilled $N_2$ 9 to enter the storage tank as a liquid, with less than 10% of the stream flashing as a dense, cold (approximately $-280°$ F.) vapor 35. The vapor portion (flash gas) is allowed to leave the storage tank and is used as small portion of the refrigeration source in the main heat exchanger that chills the inlet $N_2$ stream. After giving up its cold to the inlet stream, flash stream 35 is further warmed by heat exchange with other streams (not shown in FIG. 4), sent to molecular sieve 305 as sweep gas to remove the water and $CO_2$ captured in the sieve, and then vented to the atmosphere through vent 308. That vent stream is benign because it contains mostly $N_2$ (the main component of air) with small amounts of water and $CO_2$.

The main refrigeration loop that liquefies the $N_2$ stream also uses dry $N_2$ (or dry air, or any other suitable fluid) as the refrigerant, but without mixing the refrigerant stream with the $N_2$ stream that is to be liquefied. That independent refrigeration loop consists of several stages of compression and several stages of expansion, (all on a single shaft 309 or separated on two or more shafts), where an electric motor 301 drives the compressor stages 302, and the expander stages 304 contribute work that causes the refrigeration, as described below. The single shaft configuration shown for the various stage compressors and expanders is just one illustrative example of such cryogenic refrigeration systems. Other layouts, with multiple shafts and variations on the location of compression and expansion functions can be designed by those skilled in the art.

The compressor stages take low-pressure "warmed" refrigerant that leaves cryogenic heat exchanger 306 (having deeply chilled the $N_2$ inlet stream) and bring the refrigerant stream to a high-pressure (e.g., approximately 800 psia) in several stages of compression, with the heat of compression recovered in inter- and after-coolers 303 for use elsewhere. The near-ambient temperature high-pressure refrigerant is then expanded in stages in multi-stage expander 304. Those expansions chill the refrigerant to approximately −300° F., but having reduced its pressure to approximately 80 psia. The approximately −300° F. refrigerant cools an approximately 50° F. $N_2$ stream to approximately −280° F. in heat exchanger 306. In turn, the inbound $N_2$ stream 7 warms the refrigerant to approximately 40° F., requiring it to be re-compressed and cooled by expansion, in a continuous loop, as described above. Disclosed processes described here may have variations, in addition to the possible variations mentioned above. For example, the inlet $N_2$ may be compressed to a higher pressure, in various stages, yielding a different proportion of liquid to flash that will enter the $LN_2$ storage tank, and yielding different amounts of recoverable heat of compression. An absorption chiller driven by waste heat of compression and other waste heat sources from embodiments of the invention may provide pre-cooling of the $N_2$ stream.

Similar power enhancement is possible at natural gas-fired, combined cycle power plants, but with the following differences: the $N_2$ stream is a larger portion of the flue gas stream relative to the $CO_2$ stream, because natural gas-fired power plants produce less $CO_2$; and cold $N_2$ can first be sent to cool the inlet air of the gas turbine, and then, once the $N_2$ is warmed up, it can be sent to pick up more heat from waste heat sources in embodiments of the invention, and then to the steam portion of the combined cycle.

The liquefaction cycle requires power input to motors 301 at the $N_2$ stream compressor and at the refrigerant stream compressor, as well as minor amounts of power input for various pumps, instruments and valves. However, that power requirement is substantially offset by the power enhancement steps described herein, and more than compensated for by the total value of the carbonate, the liquid nitrogen and liquid argon sales, the recovered $H_2$, and the possible recovery of iron oxide from the ash and any other byproducts that may be made from the $N_2$ stream that is separated from the flue gas. In some embodiments, $LN_2$ liquefaction will likely be done only during off-peak power demand periods, using lower-value power to produce enough $LN_2$ for use in the methanol regeneration and power enhancement sequences, and additional $LN_2$ for off-site sales. If a cold distillation column is included (not shown in FIG. 4), then liquid argon can be drawn off from the $LN_2$, yielding another income stream.

Figure 5:
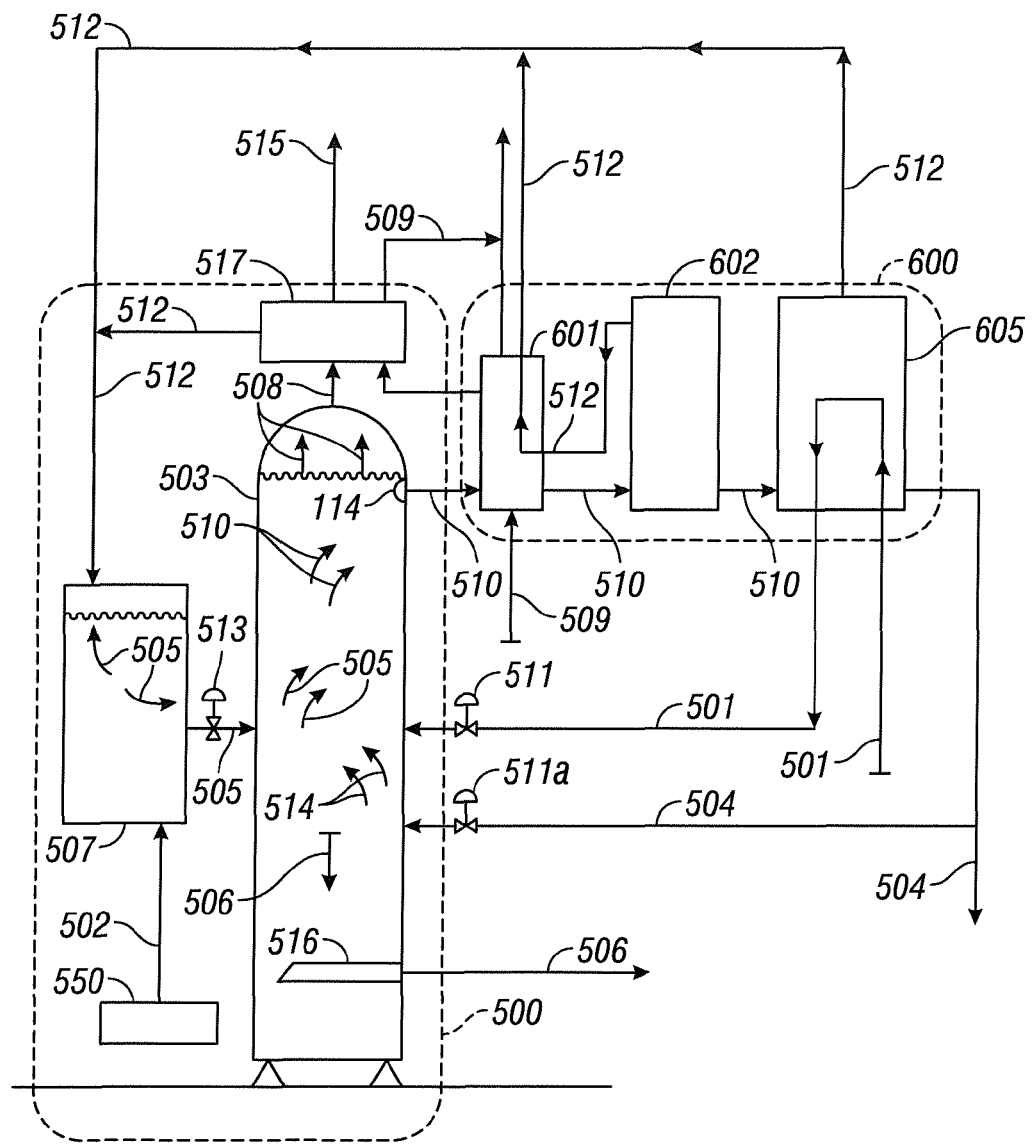
FIG. 5 is a process diagram of an embodiment of an environmental remediation process and method of recovering metals in accordance with the present disclosure.

Turning to FIG. 5, environmental remediation processes will now be described. Exemplary embodiments of an environmental remediation process comprise contacting an alkali-bearing feedstock 502 (called "alkaline feedstock" herein) with carbon dioxide 501 and water 504 with a substantially non-aqueous solvent 512 such as methanol. (The term "carbon dioxide" is used here throughout as any grade of carbon dioxide gas and any gas stream, including various "flue gases," that contain carbon dioxide.) The alkaline feedstock 502 can be one or more of many different materials such as but not limited to coal ash, ashes from biomass, municipal incinerator ash, mine spoils, sewage treatment sludge, contaminated soil, Red Mud, iron smelting and cement kiln wastes and should have a pH of about 5.6 or greater. These processes may be carried out by two major subsystems, a carbon capture assembly 500 and a solvent regeneration assembly 600. Carbon capture assembly 500 includes reaction vessel 503 and mixing vessel 507 and may also include solvent condenser 517. The solvent regeneration assembly 600 will be described in detail herein in connection with FIG. 6.

As a preliminary step, the alkaline feedstock 502 reacts with the methanol solvent 512 in mixing vessel 507 to form a suspension of methoxide 505. Reactions between the carbon dioxide 501 and water 504 and the alkaline feedstock 502 contained in the methoxide 505 occur rapidly and effectively convert the carbon dioxide 501 and the alkaline feedstock 502 into carbonate 506 and byproducts of water and heat. More particularly, a $CO_2$ stream 501 and water stream 504 are introduced into the methoxide 505, both streams entering reaction vessel 503 separately at about the same time. That separation allows full control over the flow rate of both streams and allows the water stream 504 to be adjusted in response to any minor amounts of water vapor contained in the $CO_2$ stream 501. Reaction vessel 503 receives the methoxide suspension 505, which consists of alkaline feedstock 502 and a substantially non-aqueous solvent 512, from the mixing vessel 507 through a first input 513, which is preferably an input valve. Reaction vessel 503 receives $CO_2$ stream 501 through a second input 511 and water through a third input 511a, both preferably input valves. The reactions between the $CO_2$+water (and small amounts of temporary carbonic acid 514) and the alkaline feedstock 502 contained in the methoxide 505 occur rapidly, effectively converting the gaseous $CO_2$ 501 and alkaline feedstock 502 into carbonate 506 and byproducts of water and heat.

Mixing the alkaline feedstock 502 with ambient temperature methanol 512 in mixing vessel 507 creates heat as the two compounds interact, and will produce an ionic solution of methoxide 505, which may include solvated metal hydroxide. The heat of reaction in the resultant solution, which typically is in the range of about 225° F. to about 300° F., may be recovered and used to warm other segments of the process. It should be noted that some dimethylcarbonate (DMC) may also form in mixing vessel 507, but will subsequently decompose. After heat recovery, the methoxide 505 is sent to reaction vessel 503 to host the incoming streams of water 504 and mostly dry $CO_2$ stream 501, which is bubbled through the methoxide 505. The flow rate of the methoxide 505 into reaction vessel 503, as well as the outflow of water-methanol solution 510 from reaction vessel 503 to cryogenic drying vessel 602 (via first heat exchanger 601) and to the hot distillation column 605, will depend, first, on the flow rate of the $CO_2$ stream 501 and its $CO_2$ content. Secondly, the flow rates of the $CO_2$ stream will be strictly controlled so as to never allow an amount of water into the reaction vessel which could adversely affect product properties and yield.

Methoxide 505 enters reaction vessel 503 into which the $CO_2$ stream 501 and water 504 are introduced. Some embodiments may use multiple reaction vessels in series to allow for the constant flow of flue gas. An exemplary embodiment of a reaction vessel 503 has a height of approximately 40 feet and may be made of stainless steel or appropriately coated carbon steel, or any other material that can tolerate acids, bases, water and heat without corroding. Reaction vessel 503 is fluidly connected to mixing vessel 507 such that the alkali-solvent suspension 510, here methoxide 505, enters the reaction vessel through a first input 513. As discussed in more detail herein, $CO_2$ stream 501 arrives in reaction vessel 503 through a second input 511 having given up some its heat content in a hot distillation step associated with the regeneration of the methanol.

The resulting carbonated precipitate 506 may be removed from the reaction vessel 503 mechanically, using an auger 516 or any other device or system suitable for mechanically removing carbonate precipitates. In some embodiments, up to approximately 10% of the volume of the water-methanol solution 510 remaining in reaction vessel 503 will contain suspended carbonate, which will not fall to the bottom of the reaction vessel but will fall out of solution during the methanol regeneration process. The water resulting from the acid+base reactions forms a solution with the solvent, but this water does not represent excess water since it was present originally to promote the reactions. That water-solvent solution 510 is removed through a filter 114, which prevents larger solids from leaving the reaction vessel, and which will fall to the bottom of the vessel, where they will be mechanically removed. The method further comprises removing water-solvent solution 510 from reaction vessel 503 and separating the water 504 from the solvent 512. In those embodiments that carry metallic values in the water-solvent solution 510, the metals 609 will separate out with the water 504 and can be recovered at several locations in the process. That separation and recovery process is discussed more fully below, in connection with FIG. 6. This solution 510 of water and methanol is withdrawn near the top of reaction vessel 503 at a warm temperature that reflects the optimum temperature of the reactions, which will minimize the time required for the reactions.

The carbonated precipitate 506 may undergo drying by recovered heat from elsewhere in the process, yielding a fine powder or pellets. The carbonated precipitate 506 that falls to the bottom of reaction vessel 503 may carry with it a small amount of methanol, but preferably will not carry water. The reaction will cause the water-methanol solution product 510 to rise upward in reaction vessel 503, while the precipitating carbonate 506 will fall toward the bottom. Thus, the design of the reaction vessel 503 takes advantage of the rising liquid and $CO_2$ streams 501 and the falling carbonate 506. For example, the methoxide 505 and cool $CO_2$ stream 501 enter near the bottom of reaction vessel 503, while the warmer water-methanol solution 510 is withdrawn near the top, while the inert gases 515 ($N_2$, and in some instances $O_2$) can move on to further processing steps in a nitrogen liquefaction assembly 300, as described and shown with reference to FIG. 3 and in more detail in FIG. 4. Any methanol (in the form of water-methanol solution 510) that leaves reaction vessel 503 with the carbonate is allowed to evaporate. The dry carbonate could be sent to end-users for use as fertilizer, a lime substitute, in mine reclamation, road fill, or other industrial uses. A substantial percentage of the acidic oxides of nitrogen contained in the flue gas stream will also react with the alkali in the methoxide, yielding various salts containing nitrogen, including but not limited to nitrides, thus reducing the emissions from the power plant.

Exemplary embodiments use a substantially non-aqueous solvent to host the reaction. This is accomplished by withdrawing from the top of reaction vessel 503 the water-methanol solution 510, at the same rate as the reaction produces water, and replacing the water-methanol solution 510 with an equivalent volume of rich (i.e., substantially water-free) methoxide 505. The amount of water inflow to the reaction vessel 503 is dependent on the water content of the $CO_2$ stream 501 and the quantity of water that might remain in solution in the methanol from prior inflow of $CO_2$ stream 501.

In addition, the water that is a product of the acid+base reaction needs to be withdrawn from reaction vessel 503 at a sufficient rate so as to prevent the methoxide 505 from hydrolyzing. The mostly dry $CO_2$ stream 501 is bubbled through the methoxide 505, along with an appropriate amount of water (stream 504), allowing the $CO_2$ to react with the alkaline feedstock 502 and temporarily form small quantities of carbonic acid 514, which also reacts with alkaline feedstock 502 that is held in solution 505 by the solvent 512. It is preferred that the $CO_2$ stream 501 enter reaction vessel 503 at enough pressure, e.g., approximately 16.5 psia, so that the $CO_2$ stream 501 can rise through the host methoxide 505 and allow the unreacted portion of the $CO_2$ stream to leave reaction vessel 503, as a mostly $N_2$ and vaporized methanol stream 508, where the methanol is recovered by condensation in solvent condenser 517. Accounting for pressure drop along the pre-cooling route of the $CO_2$ stream 501, the system seeks to receive the flue gas at approximately 17 psia.

With the $CO_2$ removed from the $CO_2$ stream 501 and chemically converted to carbonated precipitate 506, the remaining portion of the $CO_2$ stream 501 is mostly nitrogen. Stream 508, which contains nitrogen and some methanol, leaves the top of reaction vessel 503. The hotter the reaction, the more vaporized methanol will leave with the $N_2$ gas. Reaction temperatures of more than 150° F. will cause too much methanol to leave the vessel with the $N_2$. Thus, the heat of reaction needs to be controlled. For example the inlet methoxide stream 505 to reaction vessel 503 may be pre-cooled. Alternatively, reaction vessel 503 may be cooled internally by a heat exchanger suspended near the top of the vessel, for example, using a cold $N_2$ stream 509, to cool the liquid in the reaction vessel 503 to maintain its methanol content in a condensed (liquid) state, allowing the remaining $N_2$ vapor to move on to nitrogen liquefaction assembly 300 for liquefaction. Preferably, the reaction is allowed to reach near 150° F., tolerating some methanol boil off, but recovering that methanol immediately after it leaves reaction vessel 503 in solvent condenser 517.

The methods of controlling the temperature in the reaction vessel can include cooling the inlet streams (methoxide, water, etc.) and/or cooling the liquids in the reaction vessel by an internal heat exchanger, and/or a combination of those techniques. Those options are not illustrated in FIG. 5. Those familiar with the engineering of such heat control systems would select an optimal method. The extent to which the reaction vessel needs to be cooler than 150° F. will be determined by thermodynamic calculations that optimize the rate of the reaction but without causing excessive methanol boil off from the reaction vessel.

The stream that leaves solvent condenser 517 is flue gas with mostly $N_2$ 515, but it may also include argon, and low amounts of $O_2$, depending on the source of the flue gas. Trace amounts of water or $CO_2$ (parts per million) would be removed in a molecular sieve 305 (shown in FIG. 4) prior to the liquefaction of the $N_2$ stream 515 as discussed below. Much of the $N_2$ can be cost-effectively compressed and chilled, and thus liquefied by processes known in the art, to yield liquid nitrogen ($LN_2$) of a relatively high purity, but at much lower costs than can be produced at standard air separation plants. This process is performed by nitrogen liquefaction assembly 300, as discussed above with reference to FIG. 3 and FIG. 4.

The materials suitable as a feedstock are characterized by a key set of features which are independent of their source. Overall, a suitable feedstock is a mixture of small, particulate-size amorphous solids of an inorganic nature in a predominantly dry state. The required dryness of the feedstock is such that the water content can be removed by the methanol solvent, to the extent at which the properties of the carbonated product are not adversely affected. If the water content exceeds this limit, then excessively wet feedstock may be air dried or submitted to a physical water/solids separation, such as settlement or filtration. In this document, terms such as "little-" or "very little water" and "substantially non-aqueous" represent a quantity of water which is below the threshold of adversely affecting the properties and yield of the carbonated precipitate product. It is feedstock-, solvent- and product-dependent. The structurally supportive elements of the feedstock are microscopic particles consisting of glass-type materials and/or a variety of microcrystalline or amorphous silicates. The chemical reactivity is defined by the presence of basic or ambiphilic salts or minerals. Metal oxides and hydroxides are examples of such species. The pH of the feedstock needs to be above the first ionization step of an aqueous carbonate ion system. Generally the feedstock materials are characterized by a pH value of at or above about pH 5.6, and more particularly, at or above about pH 7.0. Setting the lower pH limit for the feedstock and the lower limit of operation for the processes near and/or above pH 5.6 ensures that the carbonated solids product is stable to rain. All the examples discussed herein contain variable amounts of glass-type materials and silicates. For environmental remediation or metal reclamation purposes acidic materials, such as acidic sludges or acidic fly ashes, can be mixed with alkaline feedstock, such as regular fly ash, to produce pH adjusted material suitable for carbonation and metals recovery or pH stabilization.

At a pH of approximately 5.6, the curves for $CO_2$ and $HCO_3^-$ intersect. This point also represents the pH value of "ideal" rain. From this point on to higher pH values, the carbonate system has the capacity to bind $CO_2$, i.e., remove it from the current earth atmosphere. At lower pH, $CO_2$ is freed and discharged into the atmosphere. For this reason, the lower theoretical limit of the applicability of disclosed processes to sequester $CO_2$ in a geochemical sense is a feedstock pH of about 5.7. Carbon dioxide binding efficiency of fly ash has been demonstrated to the level of $CaCO_3$, which on FIG. 5 would be at approximately pH 9.

In general, the $CO_2$ binding capacity of cement can be calculated using the Steinour equation (4) below, in which the weight percent $CO_2$ binding is estimated based on the oxides of calcium, sodium and potassium. It has been shown that the Steinour equation has validity for ashes as well, and can be applied to "cement" like materials in general. Sulfur as sulfur trioxide reduces $CO_2$ binding. As a part of pH range considerations, the presence of other metal oxides may play a role. This could include magnesium oxides and the alkaline forms of aluminum and titanium oxides. While, for example in Red Mud, the aluminates are not considered a source of base for $CO_2$ binding, this additional pH lowering effect can assist during $CO_2$ exposure.

$$CO_2(w\%) = 0.785(CaO_2 - 0.7SO_3) + 1.09Na_2O + 0.931K_2O \quad (4)$$

Based on the properties of the $CO_2/CO_3^{2-}$ system, feedstock can consume $CO_2$ with various degrees of efficiency to a pH level close to the first ionization step of carbonic acid. Using water as a benchmark, at a pH of approximately 5.6, the formation of bicarbonate becomes effective and $CO_2$ can be adsorbed into such a system until the pH drops much below this value. For stability considerations of carbonated media, such as solids or solutions, the pH of "clean rain" was considered as the lower limit defining environmental stability of carbonated products derived from the disclosed processes. This pH is approximately 5.6 and is the result of the carbonic acid concentration in rain obtained through the atmospheric partial pressure of $CO_2$. In the presence of carbonate solids formation during disclosed processes the optimum pH could be much higher than 5.6 and would have to be monitored for an optimum value for process control. This implies that pH ranges can be optimized for solids formation, such as limestone, or for the recovery of economically or toxicologically relevant metal salts from the feedstock. The control of pH ranges can be accomplished through the duration of the carbonation process for example. However, the details may vary even within each type of feedstock, for example different fly ashes or the particular application of the disclosed processes. To emphasize, the lower pH value selected for the viability of disclosed processes was chosen to accommodate a wide variety of feedstock, and the limit was set to the atmospheric stability of the carbonate system.

It should be noted that there are differences between basicity and alkalinity of solutions or solids. While related, alkalinity describes the capacity of a system to resist changes of the pH value of a system, often with respect to the $CO_2/CO_3^{2-}$ buffer system. In the disclosed processes, it is a mass balance issue, rather than a matter of a system resisting pH change. In the case of fly ash, the carbon binding capacity can be determined using the Steinour formula (vide supra), which is a strict mass balance equation. Alkalinity can determine the behavior of the reactor during carbonation.

One of the major applications of embodiments of the environmental remediation processes is the remediation of carbon dioxide emissions and fly ash production of feedstock sources 550 such as coal fired power plants, municipal solid waste incinerators (MSWIs), and pulp mills. In these examples, the $CO_2$ sources produce steady amounts of environmentally challenging fly ash, which can be neutralized utilizing the carbon dioxide produced at the site. The products will be an artificial limestone substrate and a separate residue of hazardous or valuable metals. The artificial limestone substrate is suitable for a variety of applications, for example, as a soil supplement in agriculture, landscaping, construction and soil stabilization. The recovered metals (some valuable and some hazardous) would be removed for further processing.

One example of a feedstock source 550 is waste from a coal-fired power plant wherein the alkaline feedstock is fly ash from coal. CaO (calcium oxide) is the principle metal oxide found in coal ash that provides reactivity toward $CO_2$. Often it is the most abundant basic metal oxide present in fly ashes. In addition to calcium, other basic metal oxides can include the oxides or hydroxides of barium, sodium, or magnesium. The composition of fly ash derived from coal is complex and highly variable. The grade of coal and its geographic origin play a major part in the composition and mineralogy of the fly ash. In exemplary embodiments, $CO_2$ is bound by fly ashes mainly as a calcium- or calcium-magnesium carbonate. Depending on the level of carbonation, it is expected that a variety of other carbonates are formed. This can include alkali carbonates and bicarbonates, iron carbonate, magnesium carbonate and others.

Another example of a feedstock source 550 are municipal solid waste incinerators. Fly ashes from MSWIs contain calcium oxide as the principle metal base. In contrast to coal, the mineralogy of MSWI fly ash appears to be less complex but it contains potentially high levels of heavy metals as well. Based on the similarities between fly and MSWI ashes, leachable metals in MSWI ashes are expected to migrate into the methanolic liquid phase, reducing metal leachable heavy metal content and making these metals available for recovery via the methanolic reaction medium.

Pulp mills waste streams are another possible feedstock source 550. Ashes derived from wood processing, such as paper mills, contain high levels of calcium oxide and are supported structurally by glass/ceramic type materials and silicates. The calcium oxide content depends on the type of tree burned (e.g., oak, birch, pine). Wood derived fly ashes are carbonated readily and can contain a variety of heavy metals. Heavy metals are contained in the plant matter in trace form and also enter through the dirt sticking to the plant matter. The burning of the wood and wood debris reduces the original mass to a small amount, concentrating metals in the ashes. Another feedstock source 550 of fly ash are cement kilns. In a cement kiln CaO is produced by heating limestone above the decarboxylation point of the carbonate stone. To generate the heat, large amounts of coal or other fuels are burned. For this reason there are two large sources of $CO_2$ present in the cement kiln: the burners and the exhaust from the actual CaO production. In this scenario, the disclosed environmental remediation processes can be utilized to resolve two issues.

The disclosed processes can be employed to remove $CO_2$ from any of the flue gas streams by carbonating the fly ash produced by the furnace and/or the degassing of the limestone. It is well established that fly ash can be a good substrate to add to cement or cement precursor depending on the type of cement produced and the operation of the cement plant. Another consideration is that cement plants produce spoils, which could be a suitable feedstock for disclosed environmental remediation processes. It should be noted that the alcoholic solvent can assist in the reduction of the organic load of the feedstock as well, as a certain amount of hazardous organic materials, such as volatile organic compounds (VOCs), fusel oils, aromatic hydrocarbons, dioxins, and so forth, are expected to at least partially dissolve in the alcoholic solvent. These organic materials can be recovered for proper disposal during the methanol regeneration process.

Red Mud, another possible feedstock, is the primary waste product generated during aluminum oxide extraction from bauxite. As a result of the Bayer extraction process, the main source of liquid phase alkalinity in the Red Mud is caustic soda (NaOH). Solid phase alkalinity is derived from species such as calcium aluminates. The water content of Red Mud is high, and for remediation purposes, it is often filtered to separate slurry with more solids from one with excessive liquids. Common mineral species found in Red Mud are silicates, the oxides of aluminum, iron and titanium and various calcium and sodium species.

The predominant carbonate formed in the carbonation of the liquids is sodium carbonate ($Na_2CO_3$). The carbonation of the solids predominantly forms calcium and sodium carbonates. In yet another embodiment of the present invention, biomass generated at sewage treatment plants (sludge) can serve as a feedstock. Sewage treatment plant sludge represents another significant waste challenge. On the one hand, the phosphate content of sewage sludge can be a desirable fertilizer source. However, the heavy metals and biohazard burden of sludge is significant. Extensive processing is required before sludge from sewage treatment plants can be used as fertilizer. Such processing may involve, among other treatments: liming, incineration, thermal fusion, or acid extraction of metals. Often a combination of those steps is involved.

The ashes from sludge incineration can contain in excess of 40% calcium oxide, but typically the calcium oxide levels are similar to most coal ashes and the bulk composition of such ash does not differ much from coal or MSWI ashes as well. However, levels of trace elements are amplified and rare earth elements can be present at enriched levels. Because the present invention leaches metals from ash materials and stabilizes the pH of ashes, biomass from sewage plants is another example of a feedstock for disclosed processes. In a sufficiently dry form, sludge may be carbonated directly in disclosed processes. If incinerated, the flue gas from the incineration can be utilized in the calcification of the ashes, while reducing leachable metals content without separate processing steps. In addition, the residual heat from the biomass combustion can power these processes in a manner consistent with that of a coal fired plant.

Furthermore, sewage treatment plants, using anaerobic digesters, produce a moist gas stream that can contain more than 50% $CO_2$ with most of the rest of the stream being methane. In one embodiment of the present invention such anaerobic digester gas would first be sent through disclosed processes, where the $CO_2$ in the gas would carbonate the mostly solid feedstock (sludge) also produced at the same sewage treatment plant. The mostly pure methane would then be used as fuel in a prime mover, producing power. The products of combustion would be added to the $CO_2$ stream that enters the reaction vessel. Thus, this embodiment yields a comprehensive process that would have zero-$CO_2$ emissions, mitigated sludge treatment (producing fertilizer and recoverable metals), and producing "renewable" energy in the form of electricity. In addition, sewage sludge can be mixed with ashes and subsequently directly submitted to the carbonation process for the direct formation of limed sludge, without prior incineration of sludge.

The suitability of Red Mud for embodiments of the environmental remediation process is given intrinsically, because of Red Mud's high basicity and because seawater based carbonation models have demonstrated the feasibility of carbon sequestration as a means of Red Mud pH remediation. However, water based applications suffer from the generation of large amounts of pH-mitigated mud, which creates a new disposal issue. This mud disposal issue is avoided entirely through the application of the disclosed processes, which yield a dry, powdery end product. If air dying of the Red Mud, prior to neutralization, is feasible, then air-dried Red Mud is a good feedstock, preferred over wet Red Mud, filtered or not.

Contaminated soils are suitable feedstock for the disclosed environmental remediation processes, for example in at least two instances of "superfund" soil remediation scenarios. The first is related to the pH stabilization of soils which have been rendered highly basic or which have lost their pH buffering capability. Examples are soils surrounding waste lagoons (trailing ponds) and other industrial sites. Another scenario is the decontamination of soils which have become burdened with heavy metals, such as arsenic, germanium, uranium, mercury, nickel or vanadium, for example. In this case, the methanolic carbonation would leach the heavy metals from the soils based on pH and/or other salt solubility effects, allowing for the isolation and recovery of those heavy metals.

In exemplary embodiments, a $CO_2$ stream may be provided by introducing a flue gas 501 to the methoxide suspension 505 such that the resulting carbonate 506 reacts with sulfur dioxide in the flue gas to form calcium sulfite. Thus, when the alkaline feedstock 502 is fly ash, the calcium in the fly ash can react with the $SO_2$ in a carbon neutral fashion. The calcium carbonate for the desulfurization process is generated in situ from fly ash, not requiring production and shipping of desulfurization substrate. In sources with high sulfur flue gas, a two-stage process can be envisaged where the first step binds $CO_2$ and the second step desulfurizes.

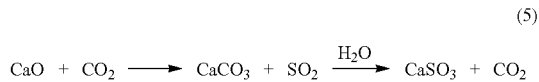

(5)

As shown in Equation 5, the CaO present in the feedstock binds the $CO_2$ of the waste gas as carbonate, forming carbonated product. In the presence of sulfur dioxide, this carbonate reacts subsequently to form calcium sulfite. This second step is the basis of flue gas desulfurization in coal fired power plants. Unlike a dedicated desulfurization process, this outcome of disclosed processes is carbon neutral, and desulfurization is intrinsic to the disclosed processes. Unlike conventional flue gas desulfurization, this feature eliminates the need for externally produced limestone, where fossil $CO_2$ is freed in addition to the $CO_2$ of coal combustion. The water shown in Equation 5 is water of reaction, as some of it is required for the conversions. The amount of water necessary is situational and can depend on the feedstock and the sulfur load of the flue gas. However, in most flue gases water is present in at least percent level concentrations, so that it can be assumed that there will typically be enough water available for the reactions to occur. Beyond this desulfurization disclosed processes will achieve ash remediation and metal salts recovery from the coal fly ash and can react with the $SO_2$ in a carbon neutral fashion. This embodiment provides significant advantages over known desulfurization processes, which utilize high-calcium content stone to desulfurize effluent gas from high-sulfur coal and oil-fired power plants. In the known processes, fossil $CO_2$ is freed in addition to the $CO_2$ generated during the coal combustion, increasing the carbon footprint of the power plant. Moreover, in this type of desulfurization the commonly employed solvent is water, generating a wet material, which requires a significant energy input to dry and finish the product.

In many of the embodiments described above, the feedstock and the $CO_2$ sources were presumed to be produced at the same location. Exemplary embodiments would transport the substrate to the $CO_2$ source, using the environmental remediation process to convert a portion of the feedstock into useful solid products, isolating certain hazardous and high-value recoverable materials for further processing, and mitigating the $CO_2$ emissions at that source. One example of that model is to transport fly ash derived from coal-fired power plants (or ash from other sources) to natural gas fired combined cycle power plants, retrofitted with the disclosed processes. For example, a single 500 MW combined cycle power plant's entire $CO_2$ output can be mitigated by the fly ash output of two 500 MW coal-fired power plants, converting the combined cycle power plant to a "zero emission" facility, and allowing for the productive use of the ash output from two coal fired power plants. If that ash output were now sent to specialized landfills for disposal, then the $CO_2$ footprint associated with the transport of the ash to the combined cycle power plant would stay essentially the same. If every third coal-fired power plant (especially the oldest, least efficient ones) were replaced by natural gas fired combined cycle power plants, and if the remaining two coal-fired power plants supplied ash for disclosed embodiments at the "replacement" combined cycle power plant, net $CO_2$ emission reduction would be 33%. The productive use of the lesser amount of ash produced at the remaining coal fired power plants would be an equally important accomplishment.

Many landfill sites now produce power from the landfill gas (LFG) generated at the landfill by the decomposition of the components that are buried at the site. Those "LFG-to-kW" facilities generate $CO_2$ in the flue gas that is the product of the combustion process, and $CO_2$ that is a significant (more than 50%) portion of the LFG that is produced. As described with combined cycle power plants, the transport of substrate to such LFG sites can create a "zero emission" configuration and can result in a useful product stream of solids. Instead of burying ash, and taking up landfill capacity, the ash would be used to mitigate the $CO_2$ output of the landfill and would yield a solid product(s) of value. As above, the transport-related $CO_2$ "costs" of moving the ash from its production site to the disclosed processes "reclamation" facility would not change.

Figure 7:
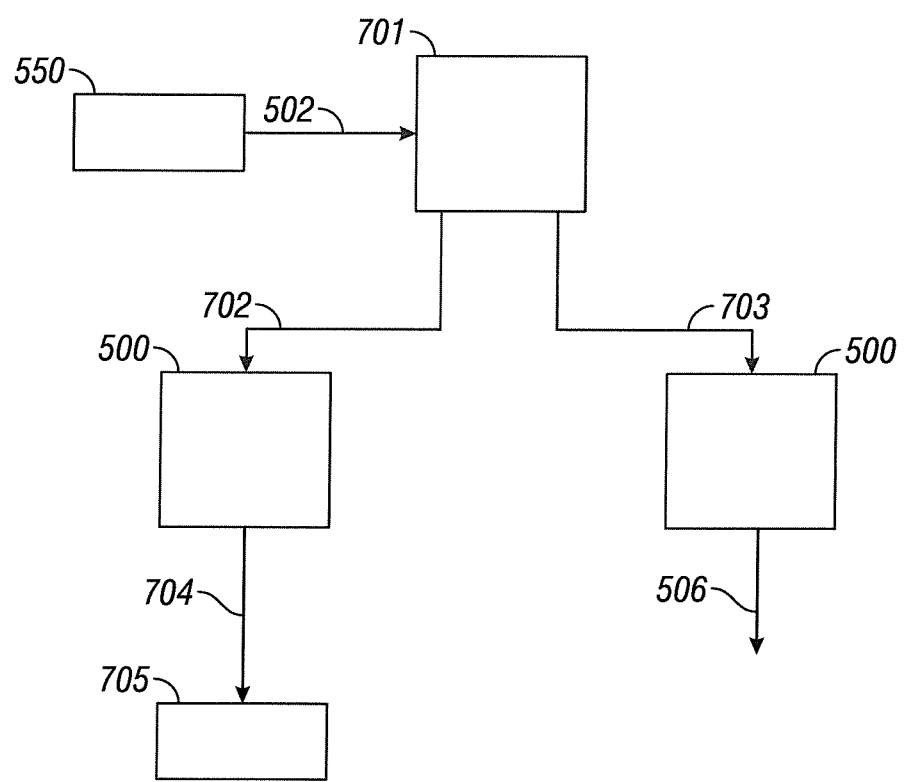
FIG. 7 is a flow chart of an embodiment of an environmental remediation process incorporating iron-substrate carbonate production in accordance with the present disclosure.

In exemplary embodiments, the resulting carbonated precipitate 506 of the environmental remediation processes can be used in an iron smelting process. The combustion of coal can generate fly ash containing significant amounts of iron minerals. As shown in FIG. 7, fly ash can be separated magnetically into fractions based on the magnetic properties of its particulate components utilizing a magnetic separator. The fraction collected by the magnet of the separator is enriched in iron oxide, while the remaining components are iron depleted. Upon carbonation of the iron enriched component, an iron-substrate carbonate is produced, which can be utilized directly in the iron smelting process. The iron-depleted component is submitted to carbonation to produce conventional finished carbonate.

More particularly, as shown in FIG. 7, an embodiment of a metals recovery method separates the feedstock 502 in a magnetic separator 701, into a magnetic stream (such as magnetic ash) 702 and into a non-magnetic stream 703. The latter is processed in a reaction array 500 (shown more fully in FIG. 5 as carbon capture assembly 500), and yields carbonated precipitate 506 described herein, such as artificial limestone. The magnetic stream 702 is processed in a separate reaction array 500, yielding iron-substrate carbonate 704, which is sent on to an iron smelter 705 where the substrate 704 beneficially contributes iron oxide and carbonates to the iron smelting and production process.

As shown in Table 1, fly ash can be enriched magnetically without a significant loss of $CO_2$ loading capacity.

TABLE 1

Weight % $CO_2$ Loading and Weight ppm Iron Content (Sample L8444)

| Sample (Methanolic Condition) | Weight % $CO_2$ | Iron (ppm) |
|---|---|---|
| Bulk Fly Ash (L8444) | 28.52 | 16,300 |
| Magnetic Component (L8445) | 22.06 | 28,700 |
| Non-Magnetic Component (L8446) | 28.72 | 17,500 |

Carbonates are widely used in iron smelting and facilitate the reduction of iron oxide to metallic iron. They are a source of oxygen and carbon at the same time. In addition, the roasting of iron ores with calcium containing materials aids in the recovery of vanadium from iron ores. Disclosed environmental remediation processes produce materials which are carbonated, high in calcium, contain carbonate and vanadium. Therefore, carbonated fly ashes produced in the disclosed processes represent ideal materials for the iron roasting process, as vanadium contained in the coal can be recovered in the iron smelting process. If the iron content of the fly ash is high enough, in excess of 15% iron by weight, then the magnetic separation may be omitted. Depending on other factors, such as a high-vanadium content of the fly ash, fly ashes could be utilized directly in the iron smelting process without any magnetic separation as well. The exact ranges for magnetic separation and what constitutes high vanadium content is largely dependent on economic factors, such a raw material costs or strategic supply issues.

By employing carbonated fly ash in the iron production industry the physical location of the disclosed processes can be moved from the fly ash source to the iron smelter. At this point the entire fly ash can be carbonated on-site and the carbonated product finishing requirements are only of a technical nature, as the carbonated fly ash is not distributed into the environment but deployed in a technical process. In addition, the fly ash stream can be separated into magnetic and non-magnetic streams (see FIG. 7) by passing the fly ash through a magnetic separator 701 The resulting low iron fly ash can be carbonated at the fly ash generating location to produce finished product for agricultural applications for example. The iron enriched stream can be shipped to an iron smelter, where it can be carbonated utilizing the $CO_2$ waste stream of the smelter and sent directly in the iron roasting process. The carbon footprint reduction would be derived from utilizing man made $CO_2$ as the carbon source as opposed to fossil carbonates from carbonate rock. The fly ash disposal issue is likewise addressed because a significant component of fly ash can be used as a mineral and carbon source in iron production.

Exemplary embodiments can be used to recover metals from waste. In rocks, soils, and ashes, metals almost never occur in their elemental form. They are present as salts or minerals. Typically, these salts and minerals are silicates, hydroxides, oxides, chlorides, phosphates and others. Some of these salts aggregate to form virtually insoluble mineral structures while others remain in salt forms of varying solubility. The term "metal" in the context of leaching, recovery and reclamation, refers to metal salts or minerals. "Metal value" refers to metals in all their forms, whether as a salt, other metal species or in elemental form. Thus, one significant benefit of disclosed processes, in addition to $CO_2$ uptake, is the "mining" of valuable metals from a waste stream.

In the case of ashes, after combustion only 10% to 20% of the original weight of the ash source remains in the ash. All volatile materials are mostly lost during combustion as, for example, water or $CO_2$. This increases the metal content of the ashes relative to the starting combustible material by a factor of 5 to 10. In general, the composition of fly ashes varies. Independent of the actual chemical form, the principal components of fly ash are expressed in weight percent of the corresponding oxide. Typical major constituents and their ranges are $SiO_2$ (silica, 5 to 60%), $Fe_2O_3$ (iron salts, 2 to 50%), CaO (calcium oxide 2 to 45%), $SO_3$ (sulfur as sulfur trioxide, 1 to 20%), $Al_2O_3$ (alumina, 5 to 30%). Other major species are the oxides of sodium, magnesium, phosphorous, titanium and potassium.

When a complex mixture, such as ash, is exposed to a solvent, such as water, salts present in the ash are released into the solvent depending on their solubility. This process is complex and referred to as leaching, which is the dissolution of metal salts. Once leaching occurs, ions can exchange and form less and more soluble metal salts, resulting in differential leaching behavior. In the case of a carbonation reaction, previously soluble metals salts, such as barium chloride, can form carbonates with a much lower solubility and subsequently become less available as a leachable species. Uranium salts are an example where carbonates can be the more soluble form under certain conditions. This example also underlines the pH dependence of certain solution processes. In the case of uranium the more soluble forms are uranyl phosphate species, but the solubility of the phosphate counter-ion is pH dependent. As the pH of the slurry decreases, phosphate increasingly becomes adsorbed on the mineral particles reducing the overall solubility of the uranium salt. Yet, in the presence of carbonate ions the formation of uranyl carbonate becomes viable, providing a leaching pathway for the uranium present in the sample. As carbonate ions are available in described metal recovery methods, the disclose methods can facilitate the removal of uranium from contaminated soil.

Figure 6:
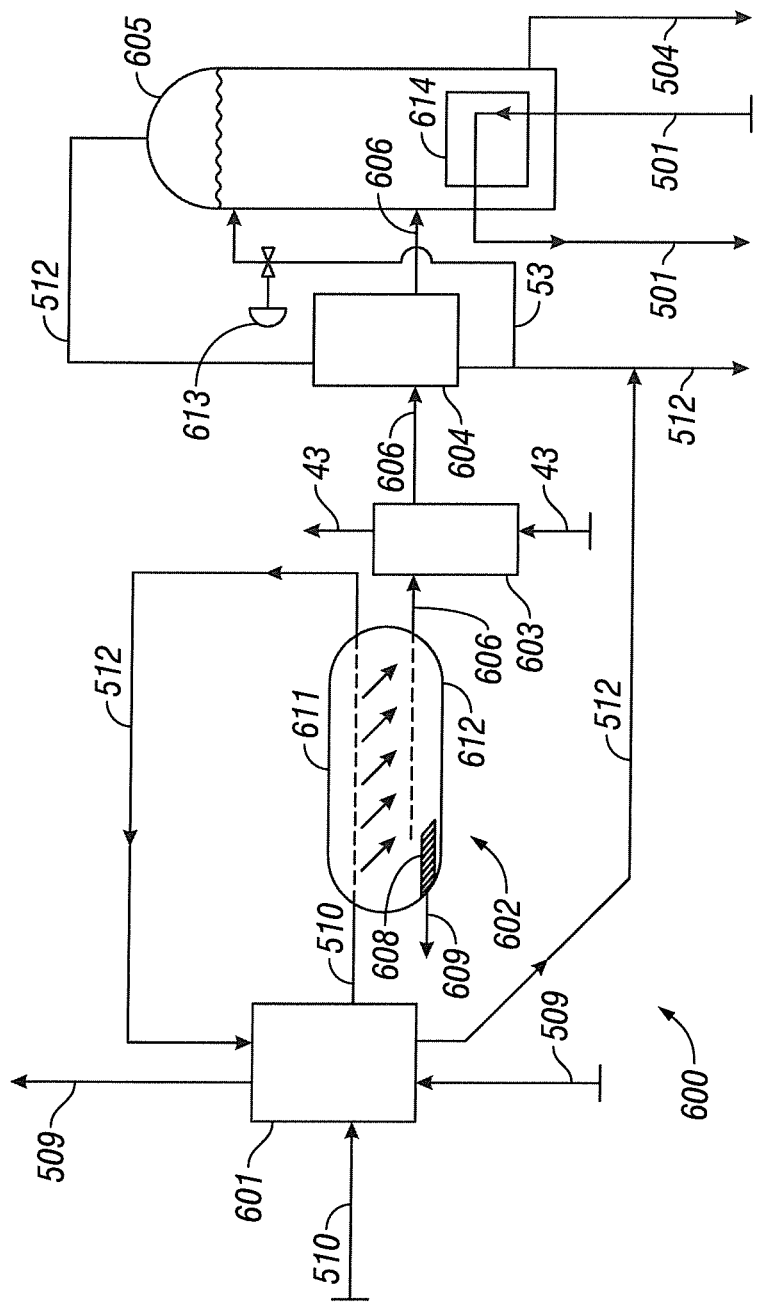
FIG. 6 is a process diagram of an embodiment of a solvent regeneration assembly in accordance with the present disclosure.

FIG. 5 also illustrates exemplary metal recovery methods comprising contacting a feedstock or waste stream 502 with a carbon dioxide stream 501 and water 504 with a substantially non-aqueous solvent 512 such as methanol. As discussed in more detail herein, the waste stream contains an alkaline feedstock and one or more concentrated metals in the form of a salt or a mineral. The waste stream 502 reacts with the methanol 512 to form a suspension of methoxide 505. Reactions between the carbon dioxide 501 and water 504 and the concentrated metals in the waste stream 502 contained in the methoxide 505 occur rapidly (sometimes in less than a second) and effectively convert the carbon dioxide 501 and the concentrated metals into carbonate 506, metals that travel with the wet methanol stream, which are more fully described on FIG. 6 and in the discussion of that figure, and byproducts of water and heat. The resulting carbonated precipitate 506 may be removed from the reaction vessel 503 mechanically. The resulting metal, which is more fully discussed below, regarding FIG. 6, is suitable for the production of refined metal or refined metal salt. Suitable for refined metals is defined as a metals concentration which is high enough, as measured in ppm, to justify further processing for the purpose of recovering commercially valuable metals, based on economic considerations. Suitable for controlled hazardous waste disposal is defined as toxic metals with no commercial value that will be disposed of by methods such as high temperature incineration or other known and sanctioned toxic metal disposal protocols.

Depending on the nature of the salt, optimum solubility in a given solids/supernatant solution matrix may be achieved at acidic, neutral or basic pH values of the solution medium. In these cases, the pH modification of the solvent during disclosed processes can assist in solubility enhancement, independent of the formation of carbonates by the metal salt in question. In the operation, this can be achieved through the control of $CO_2$ exposure. Some of the remaining water-methanol solution 510 may contain suspended carbonated precipitate 506, which will fall out of solution as part of a methanol regeneration process. The water-methanol solution 510 may be removed and the water separated from the methanol solvent.

Some of the concentrated metals in the waste stream are arsenic, mercury, lead, vanadium, and nickel. As discussed above, when contaminated soils are used as a waste stream, heavy metals such as uranium, mercury, or arsenic are contained in the soil. The methanolic carbonation of disclosed metal recovery methods would leach the heavy metals from the soils based on pH and/or other salt solubility effects, allowing for the isolation and recovery of those heavy metals.

As leachable metals are removed from the ashes during carbonation to a certain extent, the resulting carbonated product is less likely to discharge toxic metals into the environment. In particular, at this point the metal toxicity will be reduced as leachable hazardous and valuable metals have been removed from suspended carbonate precipitate 506 with the liquid phase 510 during operation of the reactor. Once the carbonate precipitate 506 has been removed from the reactor, the carbonated feedstock and leachable metal streams are separate. The hazardous and valuable metals leached from the feedstock during carbonation are found in the waste concentrates 609 shown on FIG. 6, which are derived from liquid phase 510, during the regeneration of the wet methanol. There, these metals will be found in a concentrated form 609, which is easy to handle and to ship. They can be either disposed of in a controlled, small-scale hazardous waste management facility or utilized by salt refiners for the recovery of valuable metal species, for example.

Continuing with the description of FIG. 5, and with the $CO_2$ removed from the flue gas 501 and chemically converted to carbonated precipitate 506, the remaining portion of the flue gas is mostly nitrogen. Stream 508, which contains nitrogen and some methanol, leaves the top of reaction vessel 503. The hotter the reaction, the more vaporized methanol will leave with the $N_2$ gas. Reaction temperatures of more than 150° F. will cause too much methanol to leave the vessel with the $N_2$. Thus, the heat of reaction needs to be controlled. For example the inlet methoxide stream 505 to reaction vessel 503 may be pre-cooled. Alternatively, reaction vessel 503 may be cooled internally by a heat exchanger suspended near the top of the vessel, for example, using a cold $N_2$ stream 509 to cool the liquid in the reaction vessel to maintain its methanol content in a condensed (liquid) state, allowing the remaining $N_2$ vapor to move on to nitrogen liquefaction assembly 300 for liquefaction. Preferably, the reaction is allowed to reach near 150° F., tolerating some methanol boil off, but recovering that methanol immediately after it leaves reaction vessel 503 in solvent condenser 517.

The methods of controlling the temperature in the reaction vessel can include cooling the inlet streams (methoxide, water, etc.) and/or cooling the liquids in the reaction vessel by an internal heat exchanger, and/or a combination of those techniques. Those options are not illustrated in FIG. 5. Those familiar with the engineering of such heat control systems would select an optimal method. The extent to which the reaction vessel needs to be cooler than 150° F. will be determined by thermodynamic calculations that optimize the rate of the reaction but without causing excessive methanol boil off from the reaction vessel.

The stream that leaves solvent condenser 517 is flue gas with mostly $N_2$ 515, but it may also include argon, and low amounts of $O_2$, depending on the source of the flue gas. Trace amounts of water or $CO_2$ (parts per million) would be removed in a molecular sieve prior to the liquefaction of the mostly $N_2$ stream 515 as discussed below. Much of the $N_2$ can be cost-effectively compressed and chilled, and thus liquefied by processes known in the art, to yield liquid nitrogen ($LN_2$) of a relatively high purity, but at much lower costs than can be produced at standard air separation plants. This process is performed by nitrogen liquefaction assembly 300, shown in FIG. 3.

Turning to FIG. 6, solvent regeneration assembly 600 is shown in more detail. Solvent regeneration assembly 600 is fluidly connected to reaction vessel 503 and comprises first heat exchanger 601, cryogenic drying vessel 602 fluidly connected to the first heat exchanger, which is fluidly connected to a second heat exchanger 603, which is fluidly connected to a third heat exchanger 604, and which is fluidly connected hot distillation vessel 605. Additional or fewer heat exchangers may be used as the present invention is optimized by those familiar with process design, thermodynamics and especially the variety of available heat exchangers for transferring heat between liquids and gases. Water-methanol solution 510 is sent to first heat exchanger 601, where it is deeply chilled by heat exchange with liquid $N_2$ 509 that has been pumped (by a cryogenic pump, not shown) to a high pressure, e.g., approximately 800 psia, or any other pressure suitable for the power enhancement features discussed below. The deeply chilled water-methanol solution 510 is then sent to cryogenic drying vessel 602, where the now nearly frozen water it contains (a "slush" of water, with small amounts of methanol) falls to the bottom of the cryogenic drying vessel 602, allowing that mostly water stream 606 to be drawn off from the bottom 612 of cryogenic drying vessel 602, and leaving a mostly methanol stream 512 to be drawn off from the top 611 of the vessel. If KH is being used as the alkali, some of the carbonate will fall out in the cryogenic drying vessel 602. The left over brine from the cryogenic desalination process will contain the extractable metals as a variety of metal species, such as salts, minerals and other chemical forms. As this left over brine is of a significantly reduced volume, metals can be isolated from this brine by reverse osmosis or fractional recrystallization for example, or further concentrated by solvent removal in 605. In cases where high levels of a particular element are found, this residue can serve directly in the production of metal itself after processing in 605. Optionally, the vessel 602 is equipped with a liquid/solid separator. After the cryogenic drying step, the methanol 512 and the aqueous methanol 510 fractions are not expected to carry any un-dissolved matter. It cannot be excluded that a certain amount of dissolved solids remain in these liquid streams. Remaining dissolved solids will be recovered in as discussed bellow.

In some embodiments, water-methanol stream 510 will carry resulting metal species 609 in solution with the methanol. Those resulting metal species 609 will precipitate toward the bottom 612 of the cryogenic drying vessel 602 and would be removed by mechanical means (such as an auger 608) from the bottom of the vessel, with water-methanol stream 606 removed as mostly water from a higher point on vessel 612. Streams 606 or 512 will carry only the amount of solids which cannot be excluded technically with them as they move on in the disclosed processes.

Next, the mostly water stream 606 travels on to the second heat exchanger 603, which is preferably an ambient air heat exchanger, for warming. (Stream 43 on FIG. 6 can be ambient air, moved by a fan or any other low-grade heat source.) Other sources of heat may include various heat-carrying streams, such as stream 509 in FIG. 5, after that stream leaves solvent condenser 517. That choice would serve to pre-cool the $N_2$ stream before it arrives at nitrogen liquefaction assembly 300 for liquefaction. From second heat exchanger 603, the mostly water stream 606 enters third heat exchanger 604, which acts as a methanol vapor condenser, where it is further warmed by methanol vapor 512 that is driven off from the hot distillation vessel 605. For the sake of clarity, third heat exchanger 604 is shown directly between second heat exchanger 603 and distillation vessel (or distillation column) 605. A fully engineered version of the process will likely place the third heat exchanger 604 above distillation column 605, allowing the reflux solvent stream that travels through control valve 613 to fall into the column by gravity. Alternatively, a small pump would move the reflux stream from 604 to 605. Other arrangement of heat exchangers, including where multiple units are combined into fewer units (say, even a single heat exchanger) may be possible and are contemplate by the present invention.

The methanol vapor 512 used in third heat exchanger 604 preferably is approximately 150° F. and higher, substantially pure methanol vapor. Water may be recovered from hot distillation vessel 605 and used to warm the $N_2$ stream 509 as it leaves first heat exchanger 601, on its way to its power enhancement function in power plant 400, the power cycle which produces the flue gas in the first place, and which powers the nitrogen liquefaction assembly 300. Methanol stream 512, which is a vapor at this point, is condensed to a liquid by the mostly water stream 606, allowing recovered methanol 512 to be sent back in liquid form to mixing vessel 507 for further methoxide production.

That stream 512, (with very little water content) is removed from the top of cryogenic drying vessel 602, as a "dry" methanol and returned through first heat exchanger 601 (re-covering its coldness) and then joining the return stream that exits third heat exchanger 604, with the combined mostly-methanol stream 512 sent back to mixing vessel 507. The return flow of stream 512 (mostly dry methanol) travels through first heat exchanger 601, helping the liquid $N_2$ to cool the water-methanol stream 510 from the reaction vessel 503.

The mostly water stream 511 that leaves cryogenic drying vessel 602 and is warmed in second heat exchanger 603 and third heat exchanger 604, is heated in hot distillation vessel 605, driving off its limited content of methanol vapor and allowing pure water to leave the bottom of the hot distillation vessel 605. The heat source for this distillation is the hot flue gas 501, which travels through re-boiler 614 at the bottom of hot distillation vessel 605. The hot flue gas gives up much of its heat in this step, but still has enough remaining heat that can be recovered for use elsewhere. Most of the recovered water 504 that leaves hot distillation vessel 605 is sent back to reaction vessel 503 so that the $CO_2$ in the flue gas can form carbonic acid 514, as illustrated in FIG. 5. Any extra water that may be produced can be sent through one or more layers of activated charcoal filtration, after it leaves hot distillation vessel 605, allowing that water to be potable. Alternatively, excess recovered water may be sent to the steam cycle of the power plant as a source of make-up water, replacing water lost in the steam cycle. Flue gas from natural gas fired power plants will have a higher water content, requiring less of the water 504 recovered from hot distillation vessel 605 to be returned to reaction vessel 503 to form carbonic acid with the $CO_2$ in the flue gas.

Low-pressure methanol vapor 512 leaves the top of hot distillation vessel 605 (also known as a distillation column). The heat of that vapor is used to pre-warm the cold (mostly water) stream 606 that is sent to the hot distillation vessel 605. That heat exchange causes the methanol vapor 512 to condense. Thus, as mentioned above, heat exchanger 604 can also be called a methanol vapor condenser. A portion of the condensed methanol stream is sent back to the top of the hot distillation vessel 605 as a type of reflux stream, which helps vaporize the methanol in the mostly water mixture below it. Preferably, the portion of the condensed methanol stream sent back to the top of hot distillation vessel 605 is approximately 10% of the stream. Valve 613 is shown on the reflux line, prior to the stream's entry into the vessel.

The liquid $N_2$ stream 509 travels through first heat exchanger 601, deeply chilling (to between about −50 and −80° F.) water-methanol stream 510. The flow rate of the liquid $N_2$ 509, through first heat exchanger 601, controls the exit temperature of the vaporized liquid $N_2$ (now $N_2$). In a preferred embodiment, the vaporized $N_2$ is cold enough to serve as the refrigerant in solvent condenser 517 that condenses the methanol contained in the mostly-$N_2$ stream 508 that leaves reaction vessel 503 (as seen on FIG. 5). That side-loop of $N_2$, having helped condense the methanol in the outflow stream 508 from reaction vessel 503, rejoins the high-pressure $N_2$ stream that leaves first heat exchanger 601, and is sent on to do power enhancement work in the basic power production cycle. Solvent condenser 517 recovers the heat content of the $N_2$+methanol stream 508 that leaves the warm reaction vessel 503, and transfers that heat to the cool $N_2$ side-stream 509 that leaves first heat exchanger 601, and which rejoins the main $N_2$ stream 515, on its way to the power cycle. This allows the acid+base reaction in the vessel to occur at the hottest conditions, yielding valuable low-grade heat that is transferred to the $N_2$ stream 509, shown rejoining the main $N_2$ stream that left heat exchanger 601. The warming of that $N_2$ stream that is traveling from 601 toward subsystem 400 is achieved by the cooling of $N_2$ stream 515 that leaves solvent condenser 603, on its way to liquefaction in subsystem 300.

It should be noted that the distillation of the water-methanol solution 510 that is drawn off from reaction vessel 503 can occur in several ways, including by heat (such as from the heat content of the flue gas), by heat augmented by a partial vacuum to draw off the methanol vapor from the hot distillation vessel 605, or by vapor recompression methods. However, all those methods would require more heat than is available in the flue gas. Instead, the present invention "pre-distills" the wet methanol stream and deeply chills the water-methanol solution 510 such that the denser water travels to the bottom of a container and allows that saturated methanol stream to be further distilled by any one or a combination of the above methods. It should be noted that FIG. 5, FIG. 6 and FIG. 7 do not show every possible heat recovery step that might optimize the efficiency of the process. Also, not every valve, gauge, sensor, pump or instrument is shown. Those skilled in the art of process design and thermodynamics will find optimal ways to implement the various embodiments discussed here, without departing from the core teachings of the invention.

A preferred embodiment shown in FIG. 2 relies on off-peak power stored in the form of liquid $N_2$ to achieve the distillation (regeneration) of the water-methanol solution 510. The cold distillation step yields a mostly-water stream, out of which the remaining methanol is distilled by heat. The preferred two-step (cold and hot) regeneration process requires much less heat to distill the water-methanol solution 510 if the ratio of water is very high relative to the ratio of methanol, as is the case for the arriving mostly water stream 511 that is sent to hot distillation vessel 605. The net energy required to regenerate the methanol will be less when refrigeration is included in embodiments of the invention, because the wider temperature range (between the hot and cold sides of the distillation) allow for a good deal of heat and cold recovery. Additionally, the production of liquid $N_2$ will yield a good deal of low-cost refrigeration. As noted above, FIG. 6 does not show every possible heat recovery step that may optimize the efficiency of the process, and shows only one control valve. Other valves, gauges, sensors, instruments and pumps are not shown. Other refrigeration sources, such as cold ammonia, produced by an Ammonia Absorption Chiller powered by waste heat and/or by a fired heater, can also be used to substitute for the refrigerant streams shown on FIG. 6.

Thus, it is seen that carbon capture and sequestration systems and methods and environmental remediation and metals recovery processes are provided. It should be understood that any of the foregoing configurations and specialized components or chemical compounds may be interchangeably used with any of the systems of the preceding embodiments. Although preferred illustrative embodiments of the present invention are described hereinabove, it will be evident to one skilled in the art that various changes and modifications may be made therein without departing from the invention. It is intended in the appended claims to cover such changes and modifications that fall within the true spirit and scope of the invention.

What is claimed is:
1. A method of recovering metals from waste, comprising:
   mixing a non-aqueous solvent and a waste stream containing an enriched metal and further comprising one or more members selected from the group consisting of: ammonia, lithium hydride, magnesium hydride, potassium hydride, sodium hydride, calcium oxide, lithium hydroxide, magnesium hydroxide, potassium hydroxide, or sodium hydroxide such that the solvent and waste stream form a solvent suspension;

mixing a gas stream containing carbon dioxide with the solvent suspension in a reaction vessel such that a reaction occurs, the reaction resulting in a composition comprising a carbonate, one or more metal species, water and heat, the carbonate being substantially non-aqueous and being one or more of the carbonates of the group consisting of: ammonium carbonate, lithium carbonate, magnesium carbonate, potassium carbonate, sodium carbonate, or calcium carbonate;

the carbonate precipitating out of solution, requiring no further chemical processing steps, falling toward the bottom of the reaction vessel, and accumulating at the bottom of the reaction vessel together with some substantially non-aqueous solvent;

the resulting metal species being suitable for production of refined metal, refined metal species or controlled hazardous waste disposal.

2. The method of claim 1 wherein the non-aqueous solvent is methanol.

3. The method of claim 1 wherein the waste stream is fly ash.

4. The method of claim wherein the waste stream is one or more of: Red Mud, acidic ash mixed with alkaline ash, acidic soil mixed with alkaline ash, mine spoil mixed with alkaline ash, or sewage sludge mixed with alkaline feedstock.

5. The method of claim 1 wherein the carbon dioxide is provided by exhaust from a landfill gas-fired or anaerobic gas digester-fired power plant.

* * * * *